United States Patent
Tanaka et al.

(10) Patent No.: US 11,721,487 B2
(45) Date of Patent: Aug. 8, 2023

(54) METHOD OF PRODUCING A MULTI-LAYER CERAMIC ELECTRONIC COMPONENT AND MULTI-LAYER CERAMIC ELECTRONIC COMPONENT

(71) Applicant: Taiyo Yuden Co., Ltd., Tokyo (JP)

(72) Inventors: Shota Tanaka, Tokyo (JP); Joji Kobayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/145,049

(22) Filed: Jan. 8, 2021

(65) Prior Publication Data
US 2021/0233714 A1 Jul. 29, 2021

(30) Foreign Application Priority Data
Jan. 28, 2020 (JP) .................. 2020-011933

(51) Int. Cl.
| | |
|---|---|
| H01G 4/30 | (2006.01) |
| H01G 4/012 | (2006.01) |
| H01G 4/12 | (2006.01) |
| C04B 37/00 | (2006.01) |
| H01G 4/008 | (2006.01) |

(52) U.S. Cl.
CPC ............ *H01G 4/30* (2013.01); *C04B 37/003* (2013.01); *H01G 4/008* (2013.01); *H01G 4/012* (2013.01); *H01G 4/1218* (2013.01); *C04B 2237/346* (2013.01); *C04B 2237/704* (2013.01)

(58) Field of Classification Search
CPC ........ H01G 4/30; H01G 4/012; H01G 4/1218; H01G 4/008; C04B 37/003; C04B 2237/346; C04B 2237/704
USPC ............. 361/321.1, 301.4, 321.2, 321.5, 311
See application file for complete search history.

(56) References Cited

U.S. PATENT DOCUMENTS

| | | | |
|---|---|---|---|
| 2016/0126014 A1* | 5/2016 | Lee ................. | H01G 4/224 29/25.42 |
| 2017/0018363 A1* | 1/2017 | Tanaka ............... | H01G 4/30 |
| 2017/0148572 A1* | 5/2017 | Fukunaga ........... | H01G 4/1227 |
| 2020/0043668 A1* | 2/2020 | Park .................. | C04B 35/468 |

(Continued)

FOREIGN PATENT DOCUMENTS

JP 2012-209539 A 10/2012

*Primary Examiner* — Arun Ramaswamy
(74) *Attorney, Agent, or Firm* — Stein IP, LLC

(57) ABSTRACT

A method of producing a multi-layer ceramic electronic component includes: preparing a multi-layer unit including ceramic layers laminated in a direction of a first axis, internal electrodes disposed between the ceramic layers, and first and second side surfaces facing each other in a direction of a second axis orthogonal to the first axis, the internal electrodes being exposed from the first and second side surfaces; thermocompression-bonding a first side margin sheet to the first side surface; forming a first side margin by punching the thermocompression-bonded first side margin sheet with the first side surface; thermocompression-bonding a second side margin sheet to the second side surface, the second side margin sheet including a bonding surface having a higher flexibility than the first side margin formed on the first side surface; and forming a second side margin by punching the thermocompression-bonded second side margin sheet with the second side surface.

3 Claims, 18 Drawing Sheets

(56) References Cited

U.S. PATENT DOCUMENTS

2020/0118747 A1* 4/2020 Muramatsu ............ H01G 4/012
2020/0126721 A1* 4/2020 Fukunaga .............. H01G 4/012
2020/0126724 A1* 4/2020 Takagi .................... H01G 4/30

* cited by examiner

METHOD OF PRODUCING A MULTI-LAYER CERAMIC ELECTRONIC COMPONENT AND MULTI-LAYER CERAMIC ELECTRONIC COMPONENT

CROSS-REFERENCE TO RELATED APPLICATIONS

This application claims the benefit of Japanese Application No. 2020-011933, filed Jan. 28, 2020, in the Japanese Patent Office. All disclosures of the document named above are incorporated herein by reference.

BACKGROUND ART

The present disclosure relates to a method of producing a multi-layer ceramic electronic component including side margins provided in a later step and to a multi-layer ceramic electronic component.

There is known a technique of providing side margins in a later step in the process of producing a multi-layer ceramic capacitor (see, for example, Japanese Patent Application Laid-open No. 2012-209539). This technique is advantageous for the miniaturization and increase in capacitance of the multi-layer ceramic capacitor because of allowing the thin side margins to reliably protect the side surfaces of the multi-layer unit, from which internal electrodes are exposed.

For example, in the method of producing a multi-layer ceramic capacitor, which is disclosed in Japanese Patent Application Laid-open No. 2012-209539, a multi-layer sheet including laminated ceramic sheets on which internal electrodes are printed is cut to produce a plurality of multi-layer units having side surfaces that are cut surfaces from which the internal electrodes are exposed. Subsequently, a ceramic sheet is punched with the side surface of each multi-layer unit, to form a side margin on the side surface of the multi-layer unit.

SUMMARY OF THE INVENTION

In the method disclosed in Japanese Patent Application Laid-open No. 2012-209539, in order to increase the adhesiveness of the side margin to the side surface of the multi-layer unit, the ceramic sheet is punched with the side surface of the multi-layer unit while heating the ceramic sheet. However, such a method has difficulty of controlling the thickness and the adhesiveness of the side margin on each of the side surfaces of the multi-layer unit.

In view of the circumstances as described above, it is desirable to provide a technique capable of satisfactorily forming the side margins on both the side surfaces of the multi-layer unit by a punching method.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, in one embodiment, the present disclosure provides a method of producing a multi-layer ceramic electronic component, the method including: preparing a multi-layer unit including ceramic layers laminated in a direction of a first axis, internal electrodes disposed between the ceramic layers, and a first side surface and a second side surface facing each other in a direction of a second axis orthogonal to the first axis, the internal electrodes being exposed from the first side surface and the second side surface; thermocompression-bonding a first side margin sheet to the first side surface of the multi-layer unit; forming a first side margin by punching the thermocompression-bonded first side margin sheet with the first side surface of the multi-layer unit; thermocompression-bonding a second side margin sheet to the second side surface of the multi-layer unit, the second side margin sheet including a bonding surface having a higher flexibility than a flexibility of the first side margin formed on the first side surface; and forming a second side margin by punching the thermocompression-bonded second side margin sheet with the second side surface of the multi-layer unit.

In the production process described above, the first side margin receives a pressing force in a state of being deformable by heating in not only the first thermocompression bonding of the first side margin sheet but also the second thermocompression bonding of the second side margin sheet. In other words, a larger amount of energy is applied to the first side margin than to the second side margin in the process of the thermocompression bonding performed twice. Therefore, in a general configuration, if an excessive amount of energy is applied to the first side margin, a failure resulting from a change in shape or physical property of the first side margin is prone to occur.

In this regard, the configuration according to the embodiment of the present disclosure provides a high flexibility to the bonding surface of the second side margin sheet, and thus heat and a pressing force to be applied to the second side margin sheet in the second thermocompression bonding can be reduced. This reduces the amount of energy to be applied to the first side margin in the second thermocompression bonding, and thus allows the change in shape or physical property of the first side margin in the second thermocompression bonding to be made small.

The second side margin sheet may have a higher flexibility than the first side margin sheet.

In this case, the configuration described above can be achieved by using the first and second side margin sheets having different flexibilities.

The flexibility of the first side margin sheet may be reduced before the thermocompression-bonding of the second side margin sheet.

The first side margin sheet and the second side margin sheet may include a common ceramic sheet.

In this case, even if the flexibilities of the first and second side margin sheets are not differentiated from each other, the configuration descried above can be achieved.

The second side margin sheet may include a body layer, and a bonding layer having a higher flexibility than a flexibility of the body layer and including the bonding surface.

The first side margin sheet and the body layer may include a common ceramic sheet.

In this case, the configuration descried above can be achieved by using the bonding layer.

In another aspect, the present disclosure provides a multi-layer ceramic electronic component including: a multi-layer unit including ceramic layers laminated in a direction of a first axis, internal electrodes disposed between the ceramic layers, and a first side surface and a second side surface facing each other in a direction of a second axis orthogonal to the first axis, end portions of the internal electrodes in the direction of the second axis being positioned on the first side surface and the second side surface; a first side margin that has a single-layer structure and covers the first side surface; and a second side margin that has a multi-layer structure and covers the second side surface.

The second side margin may include a body layer, and a bonding layer that bonds the second side surface and the body layer to each other.

As described above, according to the present disclosure, it is possible to provide a technique capable of satisfactorily forming the side margins on both the side surfaces of the multi-layer unit by a punching method.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, a multi-layer ceramic capacitor 10 according to each embodiment of the present disclosure will be described with reference to the drawings. Note that the drawings show the X axis, the Y axis, and the Z axis orthogonal to one another as appropriate. The X axis, the Y axis, and the Z axis define a fixed coordinate system that is fixed with respect to the multi-layer ceramic capacitor 10.

Additionally, the drawings show the x axis, the y axis, and the z axis orthogonal to one another as appropriate. The x axis, the y axis, and the z axis define a real-space coordinate system that is fixed with respect to a real space, unlike the X axis, the Y axis, and the Z axis described above. The x axis and the y axis extend in the horizontal direction, that is, the x-y plane is the horizontal plane. The z axis extends upward and downward in the vertical direction.

I First Embodiment

1. Configuration of Multi-Layer Ceramic Capacitor 10

Figure 1:
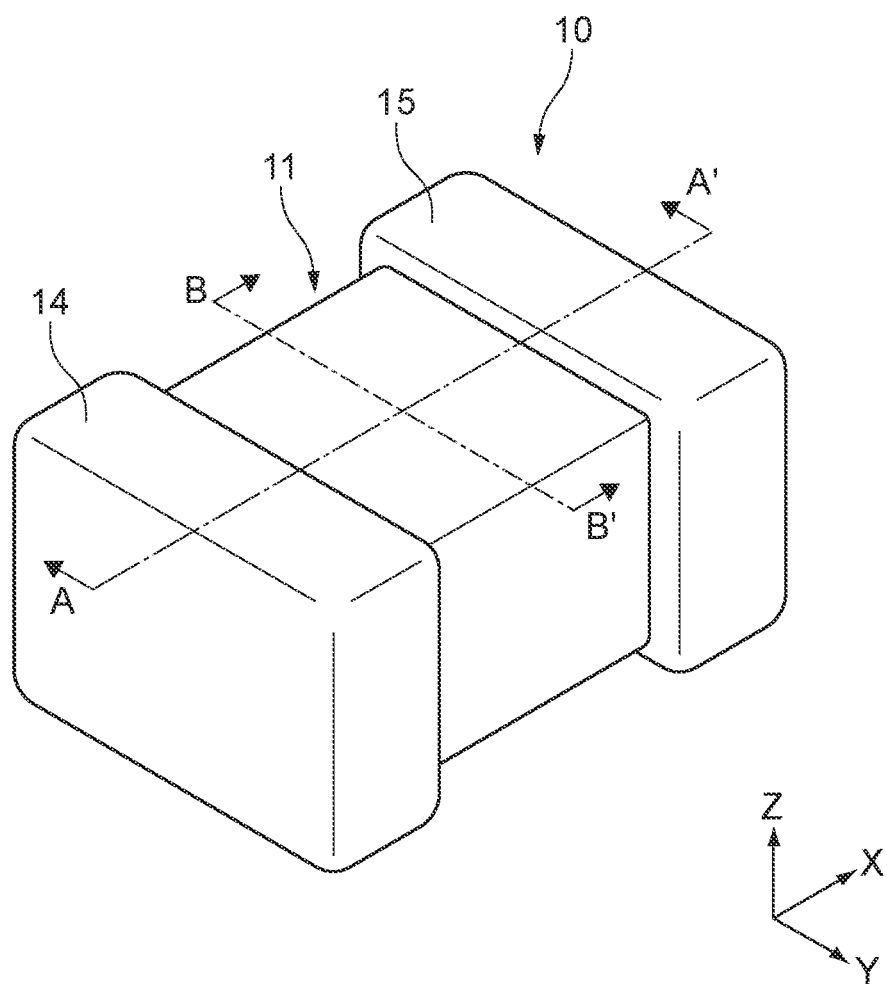
FIG. 1 is a perspective view of a multi-layer ceramic capacitor according to a first embodiment of the present disclosure.
Figure 2:
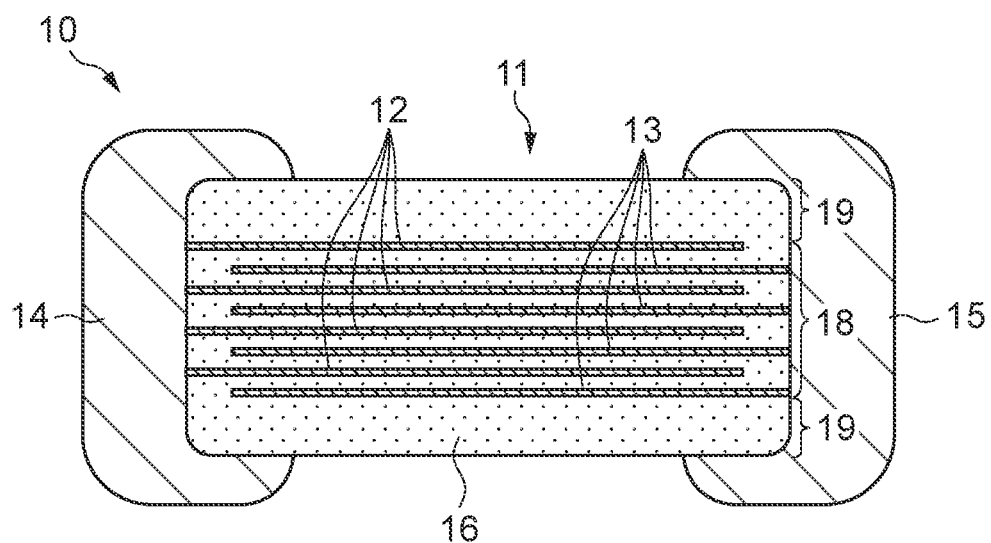
FIG. 2 is a cross-sectional view of the multi-layer ceramic capacitor taken along the A-A' line in FIG. 1.
Figure 3:
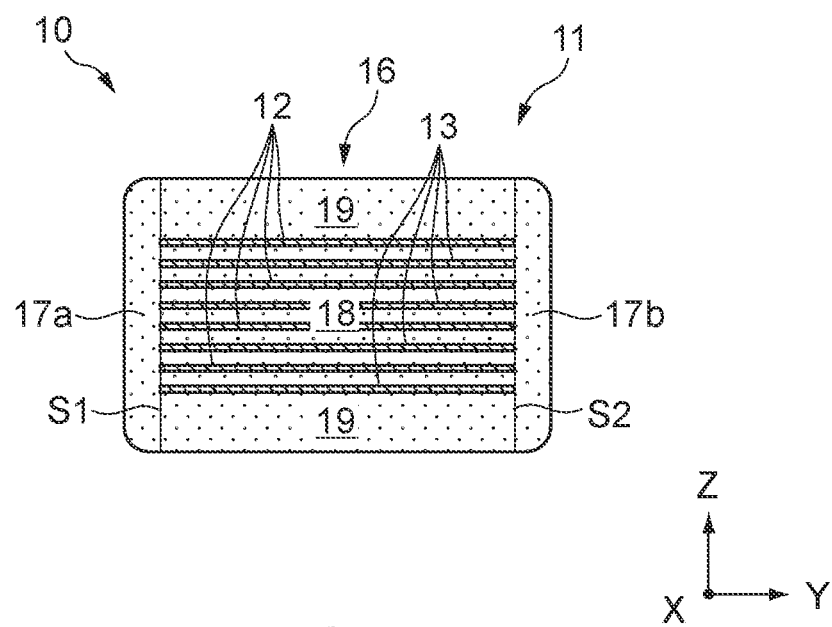
FIG. 3 is a cross-sectional view of the multi-layer ceramic capacitor taken along the B-B' line in FIG. 1.

FIGS. 1 to 3 each show a multi-layer ceramic capacitor 10 according to a first embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. The ceramic body 11 is formed as a hexahedron having first and second end surfaces orthogonal to the X axis, first and second side surfaces orthogonal to the Y axis, and first and second main surfaces orthogonal to the Z axis.

The first and second end surfaces, the first and second side surfaces, and the first and second main surfaces of the ceramic body 11 are each formed as a flat surface. The flat surface according to this embodiment does not need to be strictly flat if the surface may be recognized as being flat when viewed as a whole. For example, the flat surface according to this embodiment also includes a surface having fine irregularities thereon, a surface having a gently curved shape in a predetermined range, and the like.

The first external electrode 14 and the second external electrode 15 cover both the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, the first external electrode 14 and the second external electrode 15 have U-shaped cross sections parallel to the X-Z plane and the X-Y plane.

Note that the shapes of the first and second external electrodes 14 and 15 are not limited to those shown in FIG. 1. For example, the first and second external electrodes 14 and 15 may extend to one of the main surfaces from both the end surfaces of the ceramic body 11 and have L-shaped cross sections parallel to the X-Z plane. Alternatively, the first and second external electrodes 14 and 15 do not necessarily have to extend to any of the main surfaces and side surfaces.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like and an alloy of them.

The ceramic body 11 is formed of dielectric ceramics and includes a multi-layer unit 16, a first side margin 17a, and a second side margin 17b. The multi-layer unit 16 has first and second side surfaces S1 and S2 facing each other in the Y-axis direction, first and second end surfaces facing each other in the X-axis direction, and first and second main surfaces facing each other in the Z-axis direction.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 from above and below in the Z-axis direction and constitute the first and second main surfaces of the multi-layer unit 16.

The capacitance forming unit 18 includes first internal electrodes 12 and second internal electrodes 13. The first and second internal electrodes 12 and 13 each have a sheet-like shape extending along the X-Y plane and are disposed between the ceramic layers. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first internal electrodes 12 are drawn to the end surface covered with the first external electrode 14. Meanwhile, the second internal electrodes 13 are drawn to the end surface covered with the second external electrode 15. With this configuration, the first internal electrodes 12 are connected to the first external electrode 14, and the second internal electrodes 13 are connected to the second external electrode 15.

The first and second internal electrodes 12 and 13 are formed over the entire width of the capacitance forming unit 18 in the Y-axis direction and are exposed from both the first and second side surfaces S1 and S2 of the multi-layer unit 16. In other words, in the ceramic body 11, both end portions of the first and second internal electrodes 12 and 13 in the Y-axis direction are positioned on both the first and second side surfaces S1 and S2 of the multi-layer unit 16.

In the ceramic body 11, the first side margin 17a covers the first side surface S1 of the multi-layer unit 16, and the second side margin 17b covers the second side surface S2 of the multi-layer unit 16. This configuration can ensure insulation 5 properties between the first internal electrodes 12 and the second internal electrodes 13 on the first and second side surfaces S1 and S2 of the multi-layer unit 16 of the ceramic body 11.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. This allows the multi-layer ceramic capacitor 10 to store charge corresponding to the voltage applied between the first external electrode 14 and the second external electrode 15.

In the ceramic body 11, in order to increase capacitances of the respective ceramic layers provided between the first internal electrodes 12 and the second internal electrodes 13, dielectric ceramics having a high dielectric constant is used. Examples of the dielectric ceramics having a high dielectric constant include a material having a Perovskite structure containing barium (Ba) and titanium (Ti), which is typified by barium titanate ($BaTiO_3$).

Note that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal mainly containing copper (Cu), palladium (Pd), platinum (Pt), silver (Ag), gold (Au), or the like and an alloy of them.

2. Production Method for Multi-Layer Ceramic Capacitor 10

Figure 4:
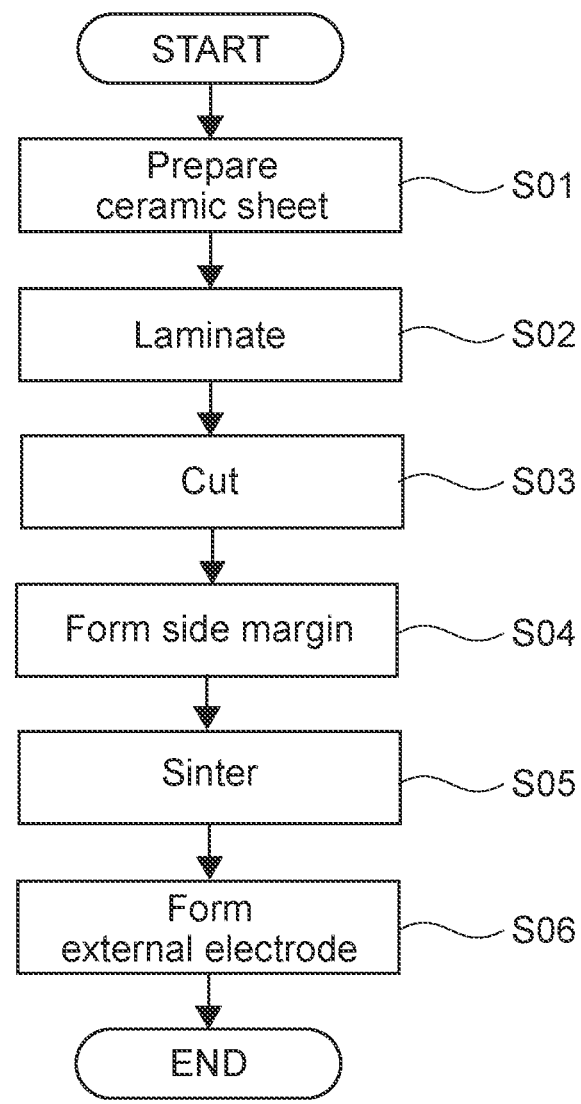
FIG. 4 is a flowchart showing a production method for the multi-layer ceramic capacitor.

FIG. 4 is a flowchart showing a production method for the multi-layer ceramic capacitor 10 according to this embodiment. FIGS. 5A to 9 are views each showing a production process for the multi-layer ceramic capacitor 10. Hereinafter, the production method for the multi-layer ceramic capacitor 10 will be described along FIG. 4 with reference to FIGS. 5A to 9 as appropriate.

2.1 Step S01: Preparation of Ceramic Sheet

In Step S01, first ceramic sheets 101 and second ceramic sheets 102 for forming the capacitance forming unit 18, and third ceramic sheets 103 for forming the covers 19 are prepared. The first, second, and third ceramic sheets 101, 102, and 103 are configured as unsintered dielectric green sheets mainly containing dielectric ceramics.

The first, second, and third ceramic sheets 101, 102, and 103 are each formed into a sheet shape by using a roll coater or a doctor blade, for example. The thickness of each of the first and second ceramic sheets 101 and 102 is adjusted in accordance with the thickness of the ceramic layer of the sintered capacitance forming unit 18. The thickness of the third ceramic sheet 103 is adjustable as appropriate.

Figures 5A, 5B, 5C:
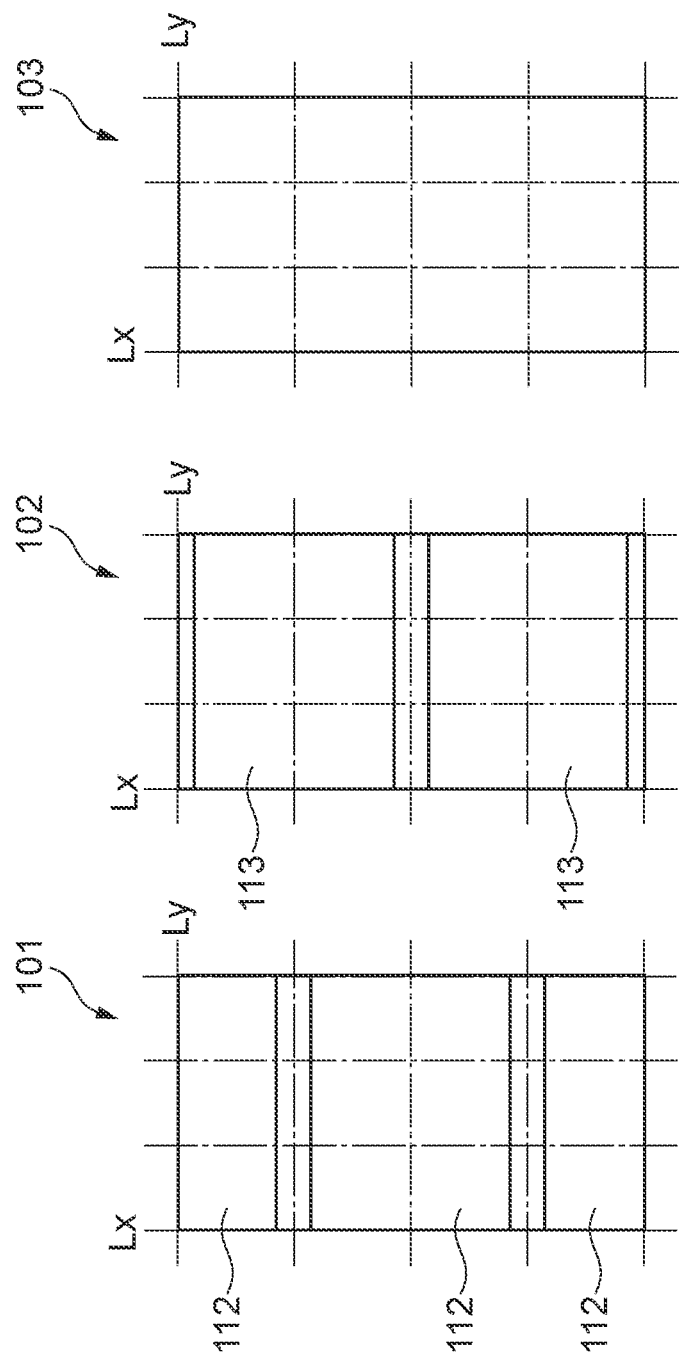
FIGS. 5A, 5B, and 5C are plan views of ceramic sheets, which are prepared in the process of preparing ceramic sheets in the production method.

FIGS. 5A, 5B, and 5C are plan views of the first, second, and third ceramic sheets 101, 102, and 103, respectively. At this stage, the first, second, and third ceramic sheets 101, 102, and 103 are each configured as a large-sized sheet that is not singulated. FIGS. 5A, 5B, and 5C each show cutting lines Lx and Ly to be used when the sheets are singulated into the multi-layer ceramic capacitors 10. The cutting lines Lx are parallel to the X axis, and the cutting lines Ly are parallel to the Y axis.

As shown in FIGS. 5A, 5B, and 5C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. Note that no internal electrodes are formed on the third ceramic sheet 103 corresponding to the cover 19.

The first internal electrodes 112 and the second internal electrodes 113 can be formed by applying an optional electrically conductive paste to the first ceramic sheets 101 and the second ceramic sheets 102, respectively. The method of applying the electrically conductive paste is optionally selectable from publicly known techniques. For example, for the application of the electrically conductive paste, a screen printing method or a gravure printing method can be used.

In the first and second internal electrodes 112 and 113, gaps are formed in the X-axis direction along the cutting lines Ly for every other cutting line Ly. The gaps between the first internal electrodes 112 and the gaps between the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

2.2 Step S02: Lamination

Figure 6:
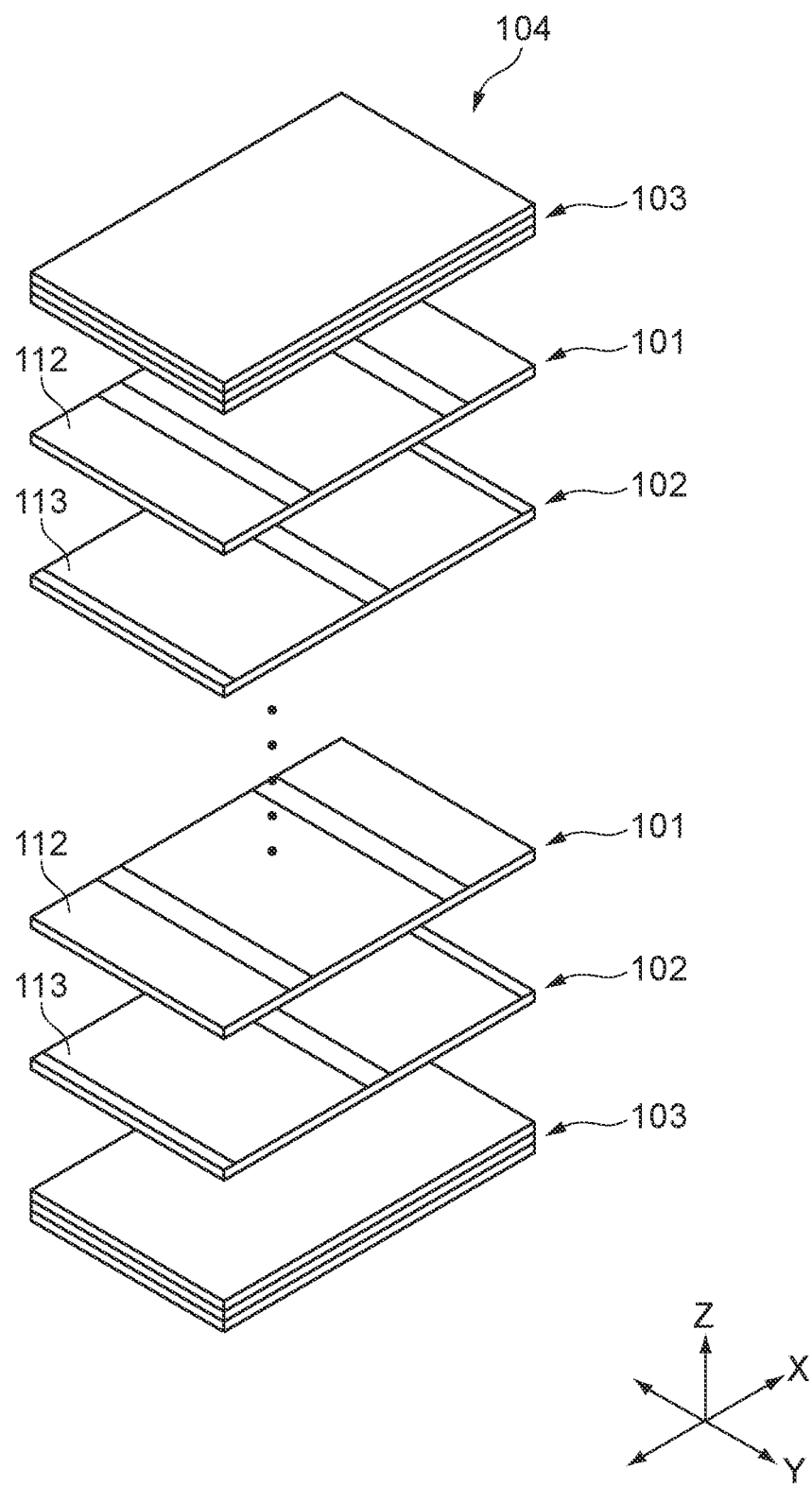
FIG. 6 is a perspective view showing a lamination process in the production method.

In Step S02, the first, second, and third ceramic sheets 101, 102, and 103 prepared in Step S01 are laminated as shown in FIG. 6, to produce a multi-layer sheet 104. In the multi-layer sheet 104, the first ceramic sheets 101 and the second ceramic sheets 102 that correspond to the capacitance forming unit 18 are alternately laminated in the Z-axis direction.

Further, in the multi-layer sheet 104, the third ceramic sheets 103 corresponding to the covers 19 are laminated on the upper and lower surfaces of the laminate including the first and second ceramic sheets 101 and 102 alternately laminated in the Z-axis direction. Note that the example of FIG. 6 shows the three third ceramic sheets 103 laminated on each of the upper and lower surfaces, but the number of third ceramic sheets 103 to be laminated can be determined as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 104.

2.3 Step S03: Cutting

In Step S03, the multi-layer sheet 104 obtained in Step S02 is cut along the cutting lines Lx and Ly, to produce unsintered multi-layer units 116. Each of the multi-layer units 116 corresponds to a multi-layer unit 16 to be obtained after sintering. The multi-layer sheet 104 can be cut with a push-cutting blade, a rotary blade, or the like.

Figure 7:
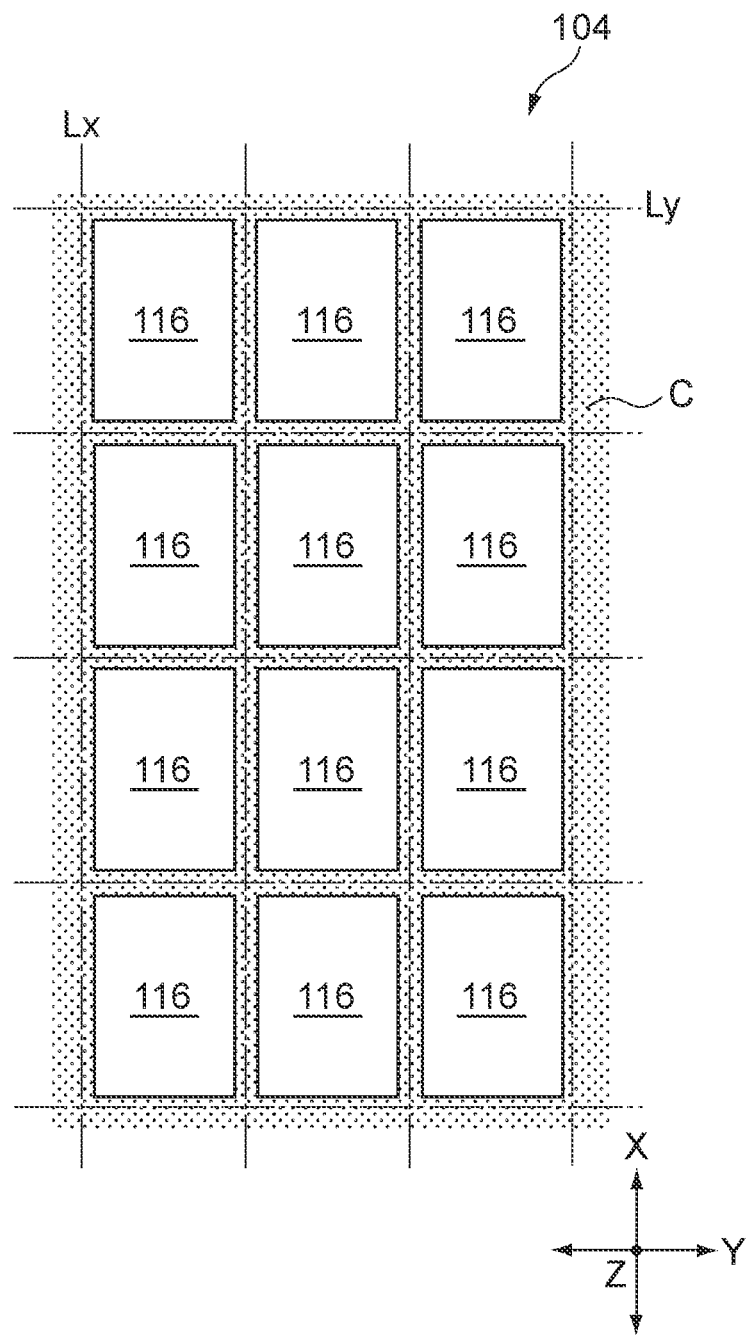
FIG. 7 is a plan view showing a cutting process in the production method.
Figure 8A:
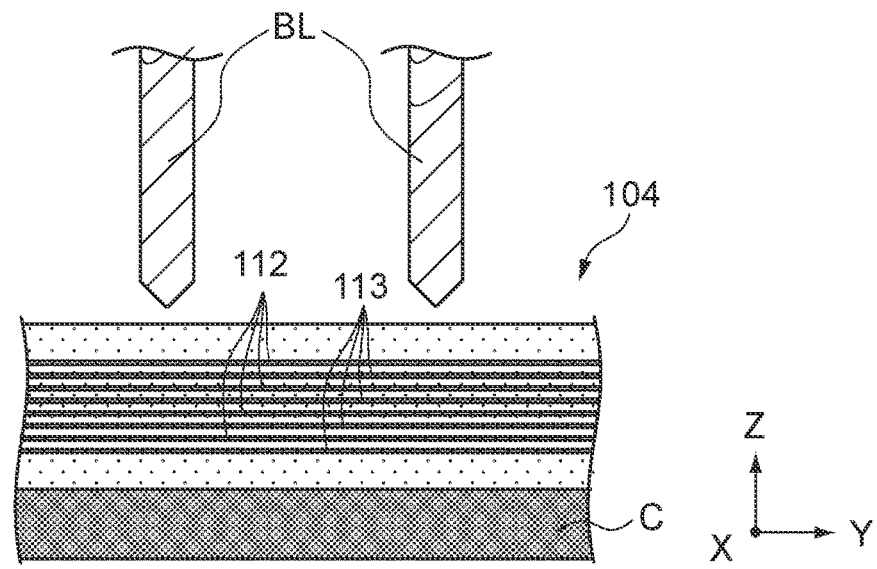
FIGS. 8A, 8B, and 8C are partial cross-sectional views showing the cutting process.
Figure 8B:
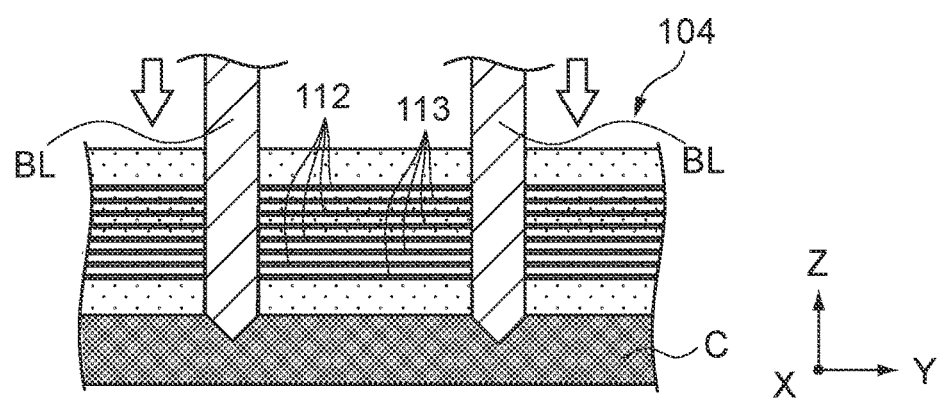
Figure 8C:
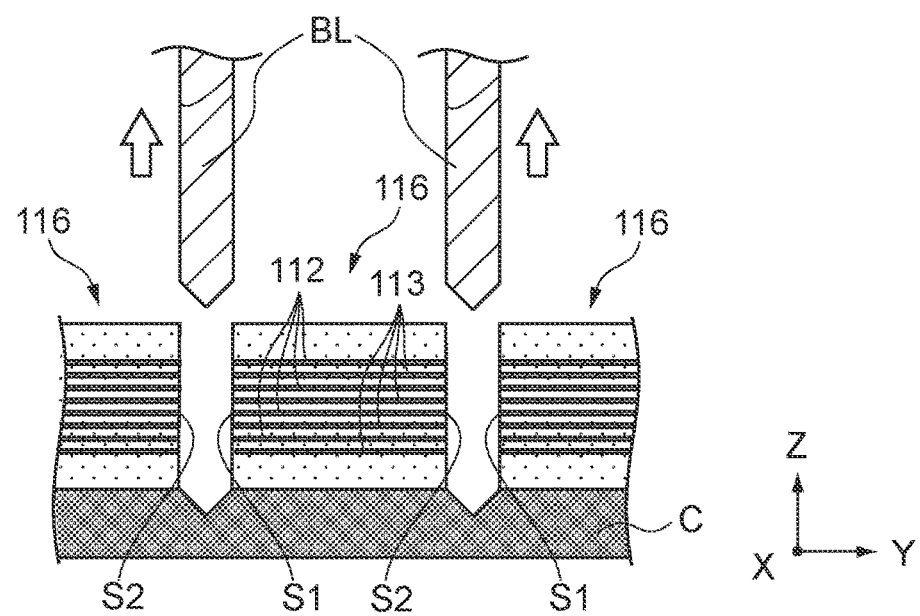

FIGS. 7, 8A, 8B, and 8C are schematic views for describing an example of Step S03. FIG. 7 is a plan view of the multi-layer sheet 104. FIGS. 8A, 8B, and 8C are cross-sectional views of the multi-layer sheet 104 taken along the Y-Z plane. The multi-layer sheet 104 is cut along the cutting lines Lx and Ly with a push-cutting blade BL while the multi-layer sheet 104 is held by an adhesive cut sheet C such as a foamed release sheet.

First, as shown in FIG. 8A, the push-cutting blade BL is disposed above the multi-layer sheet 104 in the Z-axis direction, with the tip of the push-cutting blade BL facing the multi-layer sheet 104 downward in the Z-axis direction. Next, as shown in FIG. 8B, the push-cutting blade BL is moved downward in the Z-axis direction until the tip of the push-cutting blade BL reaches the cut sheet C to penetrate the multi-layer sheet 104.

Subsequently, as shown in FIG. 8C, the push-cutting blade BL is moved upward in the Z-axis direction and pulled out of the multi-layer sheet 104. Thus, the multi-layer sheet 104 is cut in the X- and Y-axis directions, thus forming a plurality of multi-layer units 116 each having the first and second side surfaces S1 and S2 from which the first and second internal electrodes 112 and 113 are exposed in the Y-axis direction.

2.4 Step S04: Formation of Side Margin

In Step S04, unsintered first and second side margins 117a and 117b are provided to the multi-layer unit 116 obtained in Step S03. With this configuration, an unsintered ceramic body 111 having the first and second side surfaces S1 and S2, from which the first and second internal electrodes 112 and 113 are exposed, and which are covered with the first and second side margins 117a and 117b, is obtained as shown in FIG. 9.

Step S04 of this embodiment is configured such that both the first and second side margins 117a and 117b can be satisfactorily formed on the first and second side surfaces S1 and S2 of the multi-layer unit 116, respectively. The method of forming the first and second side margins 117a and 117b in Step S04 will be described later in detail.

2.5 Step S05: Sintering

Figure 9:
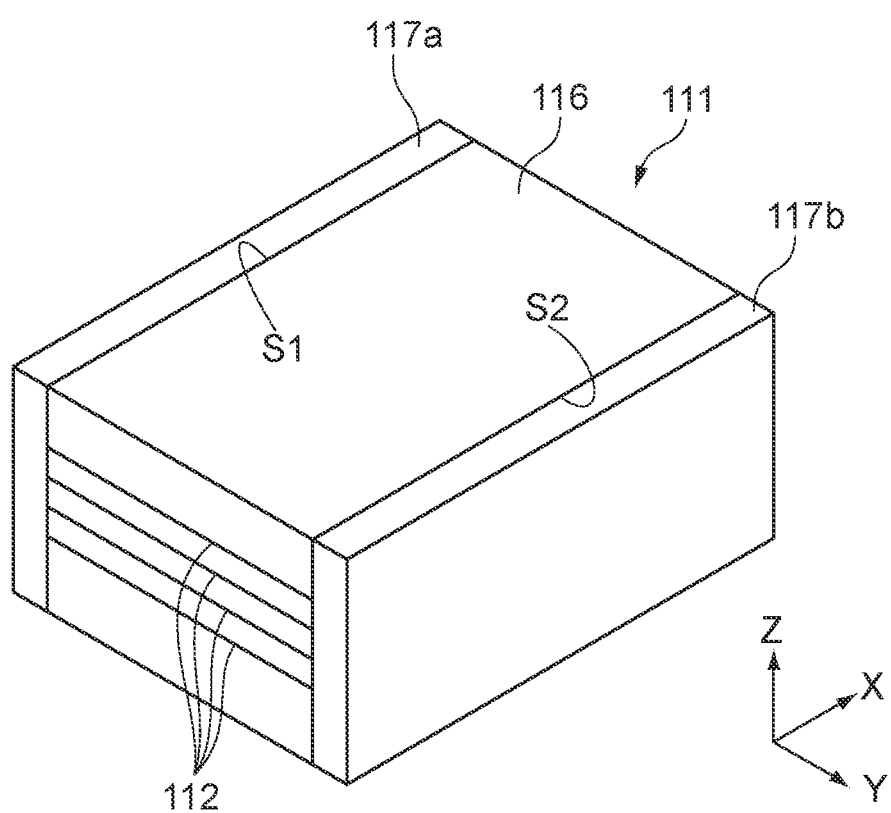
FIG. 9 is a perspective view of an unsintered ceramic body obtained in the process of forming side margins in the production method.

In Step S05, the ceramic body 111 shown in FIG. 9, which is obtained in Step S04, is sintered to produce the ceramic body 11 of the multi-layer ceramic capacitor 10 shown in FIGS. 1 to 3. In other words, through Step S05, the multi-layer unit 116 becomes the multi-layer unit 16, and the first and second side margins 117a and 117b become the first and second side margins 17a and 17b.

A sintering temperature in Step S05 can be determined on the basis of a sintering temperature for the ceramic body 111. For example, if a barium titanate ($BaTiO_3$) based material is used, the sintering temperature can be set to approximately 1000 to 1300° C. Further, sintering can be performed in a reduction atmosphere or a low-oxygen partial pressure atmosphere, for example.

2.6 Step S06: Formation of External Electrode

In Step S06, the first and second external electrodes 14 and 15 are formed in both the end portions of the ceramic body 11 in the X-axis direction obtained in Step S05, to produce the multi-layer ceramic capacitor 10 shown in FIGS. 1 to 3. The method of forming the first and second external electrodes 14 and 15 in Step S06 is optionally selectable from publicly known methods.

Through the above step, the multi-layer ceramic capacitor 10 is completed. In this production method, the first and second side margins 117a and 117b are formed on the first and second side surfaces S1 and S2 of the multi-layer unit 116, from which the first and second internal electrodes 112 and 113 are exposed. Thus, the positions of the end portions of the first and second internal electrodes 12 and 13 in the Y-axis direction in the ceramic body 11 fall within the range of 0.5 μm.

3. Method of Forming First and Second Side Margins 117a and 117b

Figure 10:
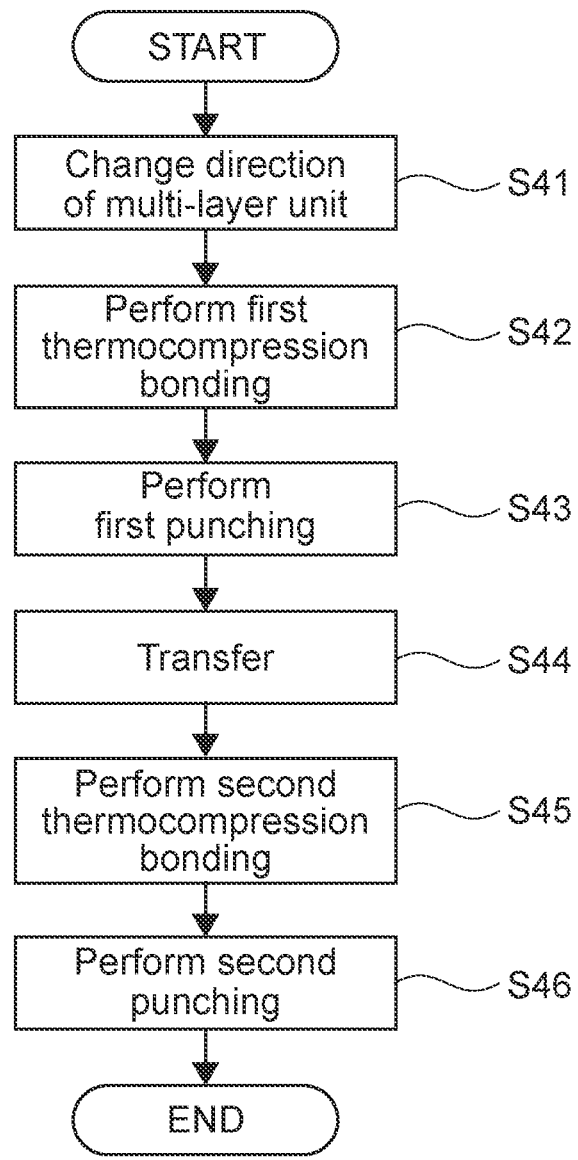
FIG. 10 is a flowchart showing the process of forming side margins.

FIG. 10 is a flowchart showing the method of forming the first and second side margins 117a and 117b in Step S04 described above. FIGS. 11A to 15C are views for describing the method of forming the first and second side margins 117a and 117b. Hereinafter, the method of forming the first and second side margins 117a and 117b will be described along FIG. 10 with reference to FIGS. 11A to 15C as appropriate.

3.1 Step S41: Change of Direction of Multi-Layer Unit

In Step S41, the directions of the plurality of multi-layer units 116 obtained after Step S03 are changed. In other words, in the state immediately after Step S03 shown in FIG. 8C, the first and second side surfaces S1 and S2 of the multi-layer units 116 adjacent to each other are close to and face each other in the Y-axis direction, which makes it difficult to form the first and second side margins 117a and 117b on the first and second side surfaces S1 and S2 of the multi-layer units 116. For that reason, in Step S41, the directions of the plurality of multi-layer units 116 are changed such that the first and second side surfaces S1 and S2 face up and down in the vertical direction, respectively.

Examples of the method of chancing the directions of the first and second side surfaces S1 and S2 of the multi-layer units 116 include publicly known methods such as a rolling method. In the rolling method, first, the multi-layer units 116 are attached to a first adhesive sheet F1 with extensibility from the cut sheet C, and the first adhesive sheet F1 is extended to widen the intervals between the multi-layer units 116.

Subsequently, the plurality of multi-layer units 116 are caused to roll on the first adhesive sheet F1. At that time, for example, use of a rolling plate allows all of the multi-layer units 116 to roll in a lump. Thus, the multi-layer units 116 are rotated by 90 degrees, so that the first and second side surfaces S1 and S2 can face up and down in the z-axis direction, respectively (see FIG. 11A).

More specifically, in any of the multi-layer units 116 obtained after Step S41, the second side surface S2 facing downward in the z-axis direction is held by the first adhesive sheet F1, and the first side surface S1 faces upward in the z-axis direction. Thus, the first side margins 117a can be formed in a lump on all of the first side surfaces S1 of the multi-layer units 116, which face upward in the z-axis direction.

3.2 Step S42: First Thermocompression Bonding

Figure 11A:
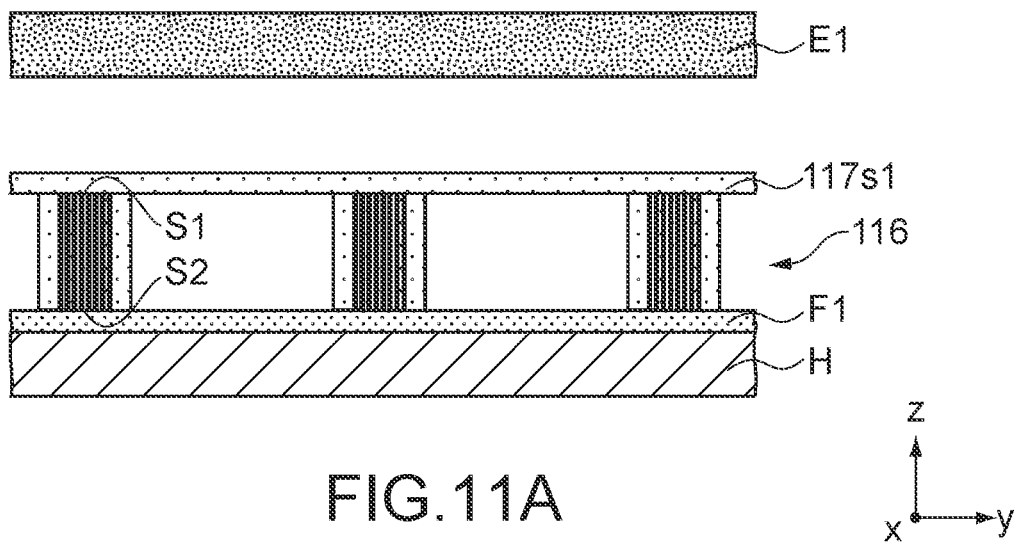
FIGS. 11A, 11B, and 11C are partial cross-sectional views showing a first thermocompression bonding process in the process of forming side margins.
Figure 11B:
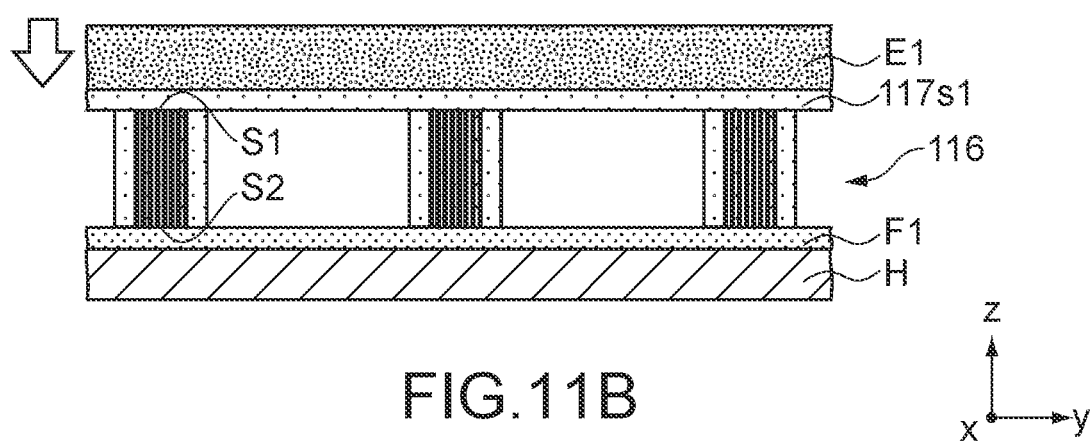
Figure 11C:
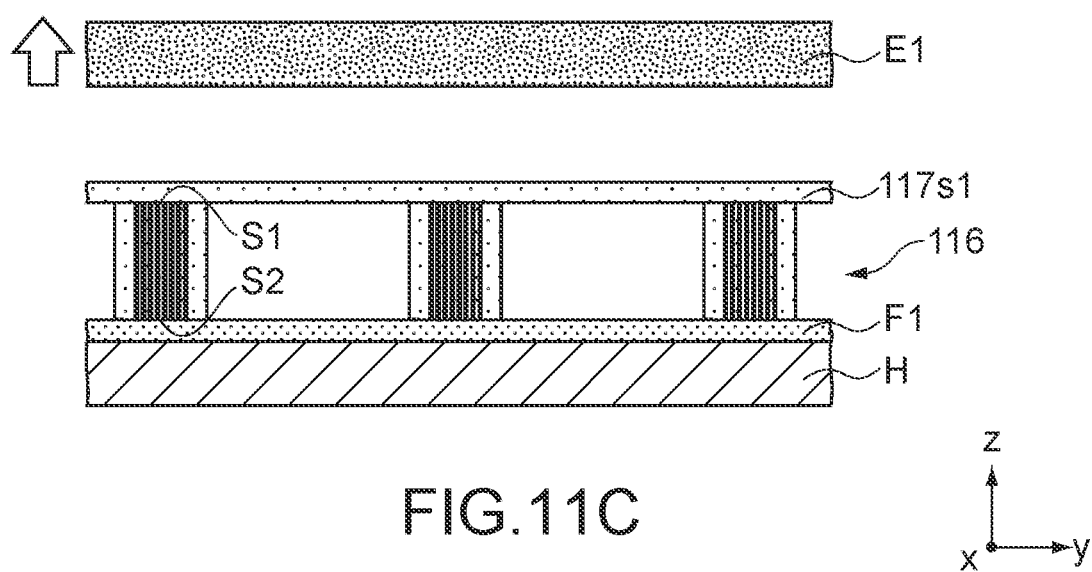

In Step S42, a first side margin sheet 117s1 constituting the first side margin 117a is thermocompression-bonded to the first side surfaces S1 of the multi-layer units 116 faced upward in the z-axis direction in Step S41. FIGS. 11A to 11C are views showing a first thermocompression bonding process in Step S42.

First, as shown in FIG. 11A, the lower surface of the first adhesive sheet F1 in the z-axis direction is held by the upper surface of a holding member H in the z-axis direction. A continuous first side margin sheet 117s1 extending along the x-y plane is then disposed on the first side surfaces S1 of the multi-layer units 116 so as to cover all of the first side surfaces S1 in a lump.

The first side margin sheet 117s1 is constituted as an unsintered dielectric green sheet. The configuration of the first side margin sheet 117s1 may be similar to or different from the configurations of the first, second, and third ceramic sheets 101, 102, and 103 prepared in Step S01 for forming the multi-layer unit 116.

The holding member H is a rigid body having a flat plate-like shape extending along the x-y plane, and can be formed of a material generally classified as a rigid body, such as stainless-steel or aluminum. Note that the holding member H does not need to directly hold the first adhesive sheet F1 and may hold the first adhesive sheet F1 via another sheet such as a release sheet.

Additionally, a flat plate-like first pressing member E1 extending along the x-y plane is disposed above the first side margin sheet 117s1 in the z-axis direction. The first pressing member E1 is formed of an elastically deformable material. The material for forming the first pressing member E1 is optionally selectable from, for example, various rubbers and various elastomers.

The first pressing member E1 is configured to be capable of heating the lower surface thereof in the z-axis direction using a built-in heater or the like so as to heat the first side margin sheet 117s1 at the time of pressing. The temperature of the lower surface of the first pressing member E1 in the z-axis direction is favorably set to a transition point of the first side margin sheet 117s1 or higher.

Next, as shown in FIG. 11B, the first pressing member E1 is moved downward in the z-axis direction, and a pressing force downward in the z-axis direction is applied to the first side margin sheet 117s1 by using the first pressing member E1. At that time, the first side margin sheet 117s1, which is softened by heat, is pressed against the first side surfaces S1 of the respective multi-layer units 116.

Thus, the first side margin sheet 117s1 is flexibly deformed conforming to fine unevenness and thus comes into close contact with the first side surfaces S1 of the respective multi-layer units 116. Therefore, in the first side margin sheet 117s1, high adhesiveness to the first side surfaces S1 of the respective multi-layer units 116 is obtained.

Subsequently, as shown in FIG. 11C, the first pressing member E1 is moved upward in the z-axis direction. Thus, the first pressing member E1 is separated from the first side margin sheet 117s1, and the first side margin sheet 117s1 is held in close contact with the first side surfaces S1 of the respective multi-layer units 116.

3.3 Step S43: First Punching

Figure 12A:
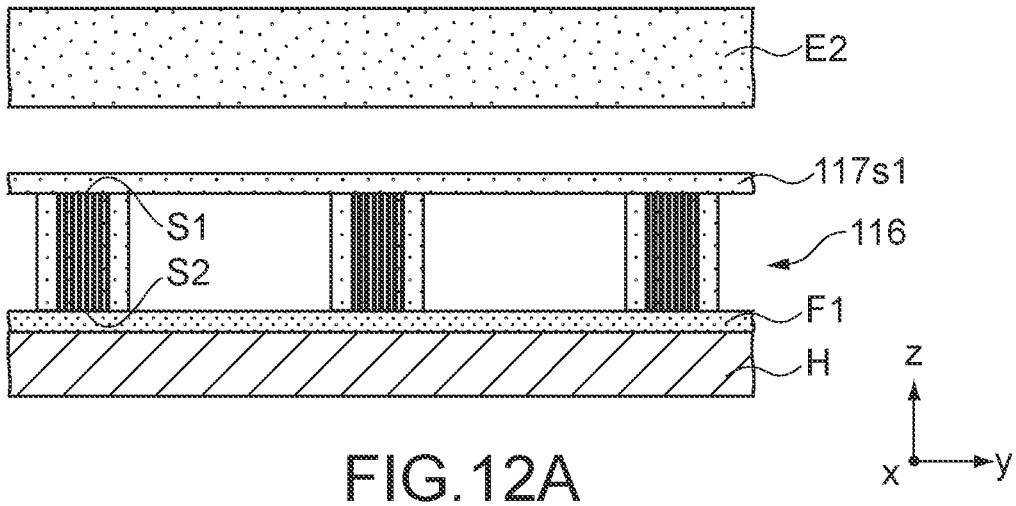
FIGS. 12A, 12B, and 12C are partial cross-sectional views showing a first punching process in the process of forming side margins.
Figure 12B:
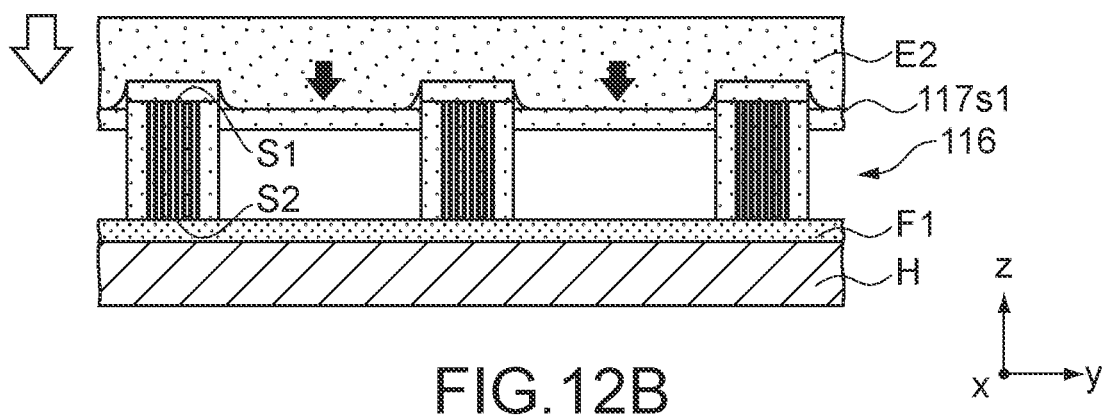
Figure 12C:
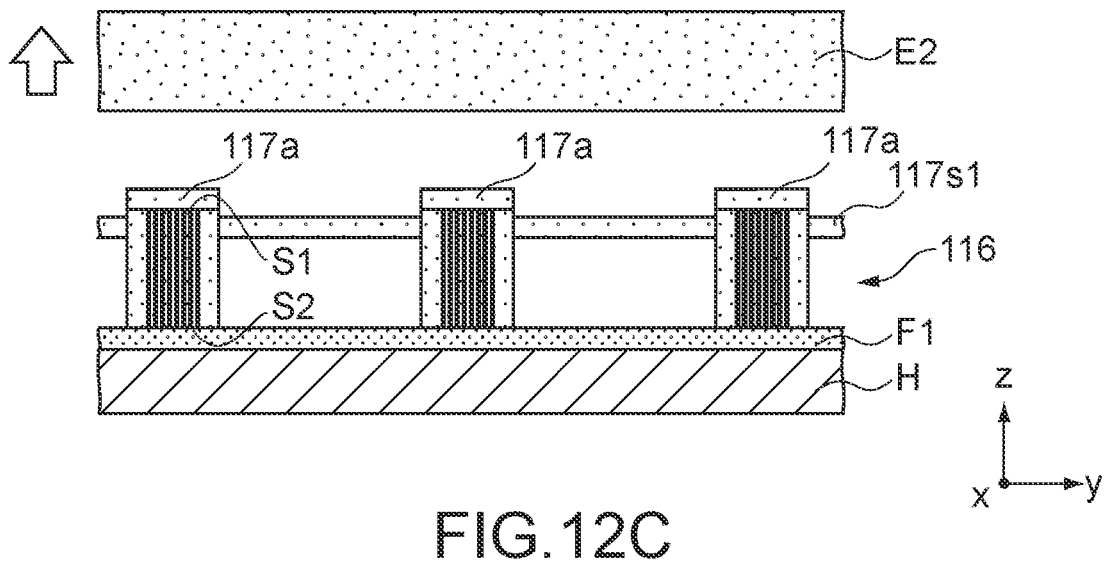

In Step S43, the first side margin sheet 117s1 thermocompression-bonded in Step S42 is punched with the first side surfaces S1 of the respective multi-layer units 116. FIGS. 12A to 12C are views showing a first punching process in Step S43.

First, as shown in FIG. 12A, the lower surface of the first adhesive sheet F1 in the z-axis direction is held by the holding member H. Additionally, a flat plate-like second pressing member E2 extending along the x-y plane is disposed above the first side margin sheet 117s1 in the z-axis direction. The second pressing member E2 is formed of an elastically deformable material.

In order to obtain a satisfactory punching quality, the second pressing member E2 is expected to have a higher flexibility than the first pressing member E1 used for the thermocompression bonding. For that reason, the material for forming the second pressing member E2 is optionally selectable from materials with a high flexibility such as various rubbers and various elastomers.

Next, as shown in FIG. 12B, the second pressing member E2 is moved downward in the z-axis direction to come into contact with the first side margin sheet 117s1 and further pressed onto the first side margin sheet 117s1 downward in the z-axis direction.

At that time, the second pressing member E2 bites into spaces formed between the multi-layer units 116 and thus pushes downward in the z-axis direction the regions of the first side margin sheet 117s1, which are not held by the first side surfaces S1 of the multi-layer units 116. In such a manner, the first side margin sheet 117s1 is cut by a shear force, which is applied in the z-axis direction, along the outer edges of the first side surfaces S1 of the respective multi-layer units 116.

Subsequently, as shown in FIG. 12C, the second pressing member E2 is moved upward in the z-axis direction and thus separated from the first side margin sheet 117s1. At that time, the first side margin sheet 117s1 left on the first side surface S1 of each multi-layer unit 116 is the first side margin 117a. The first side margin sheet 117s1 left in the spaces between the multi-layer units 116 is removed.

In Step S43, the first side margin sheet 117s1 is not heated to keep a lower temperature than in Step S42, and thus a shear force enough to punch the first side margin sheet 117s1 is easily obtained. Note that, in Step S43, the first side margin sheet 117s1 may be cooled in order to obtain a shear force more effectively.

3.4 Step S44: Transfer

In Step S44, the plurality of multi-layer units 116, on which the first side margins 117a are formed in Step S43, are transferred from the first adhesive sheet F1 to a second adhesive sheet F2. Specifically, from the state obtained after Step S43, first, the second adhesive sheet F2 is attached to the first side margins 117a formed on the first side surfaces S1 of the multi-layer units 116.

Next, the plurality of multi-layer units 116, on which the first side margins 117a are formed and which are sandwiched between the first adhesive sheet F1 and the second adhesive sheet F2, are turned upside down in the z-axis direction. The first adhesive sheet F1 is then peeled off from the second side surfaces S2 of the multi-layer units 116. In such a manner, in each of the multi-layer units 116, the second side surface S2 faces upward in the z-axis direction (see FIG. 13A).

3.5 Step S45: Second Thermocompression Bonding

Figure 13A:
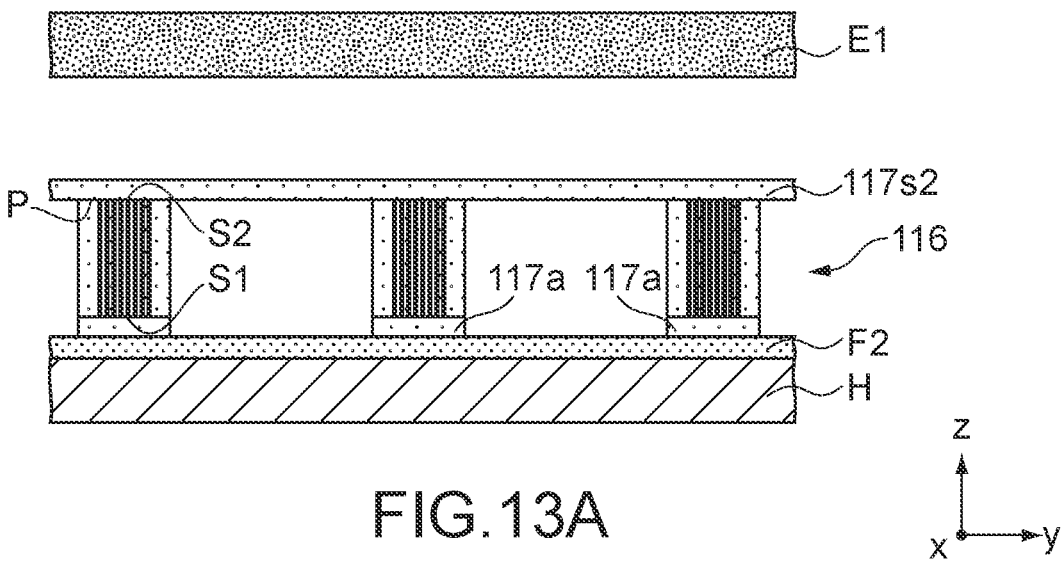
FIGS. 13A, 13B, and 13C are partial cross-sectional views showing a second thermocompression bonding process in the process of forming side margins.
Figure 13B:
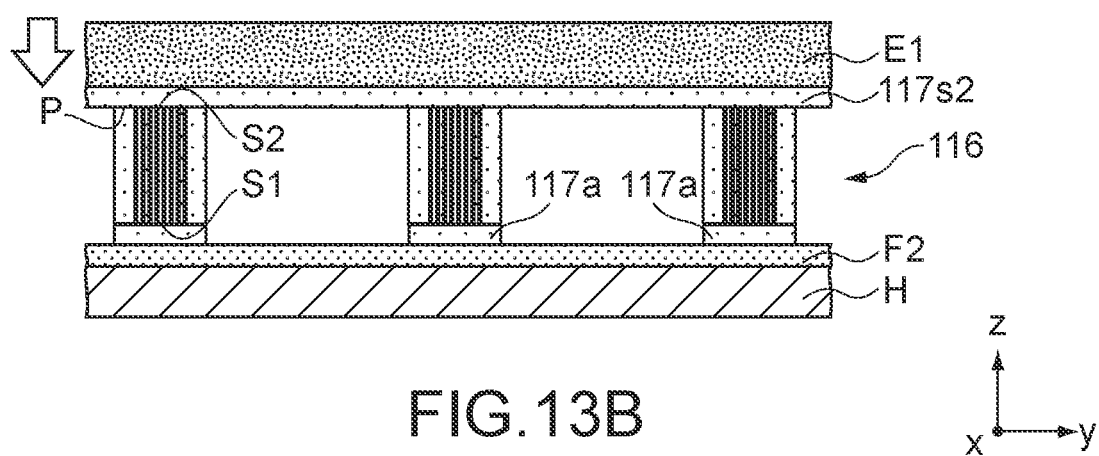
Figure 13C:
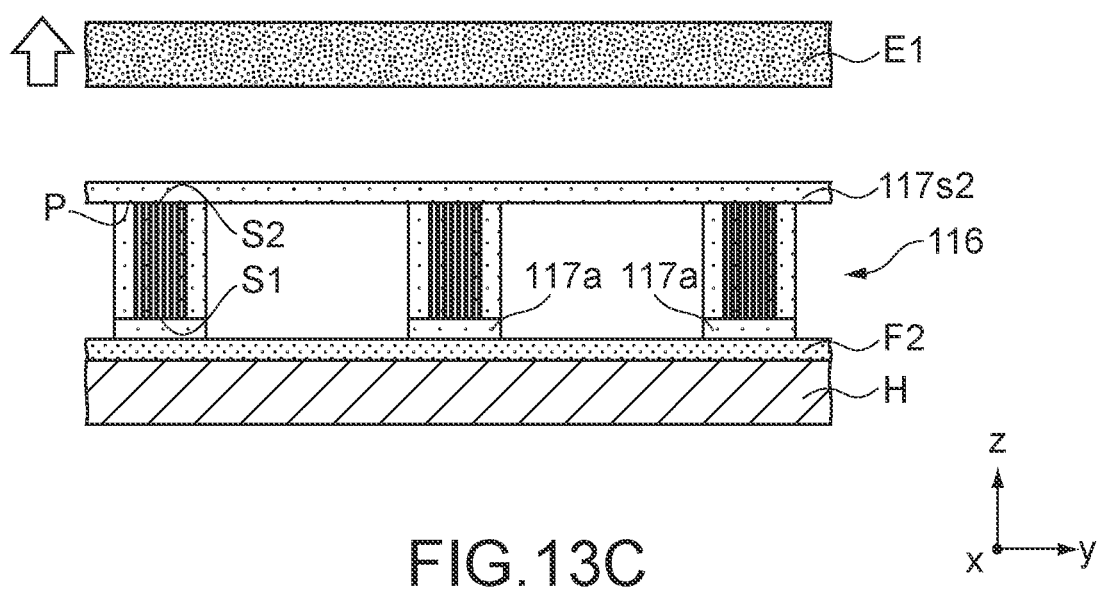

In Step S45, a second side margin sheet 117s2 constituting the second side margin 117b is thermocompression-bonded to the second side surfaces S2 of the multi-layer units 116 faced upward in the z-axis direction in Step S44. FIGS. 13A to 13C are views showing a second thermocompression bonding process in Step S45.

First, as shown in FIG. 13A, the lower surface of the second adhesive sheet F2 in the z-axis direction is held by the upper surface of the holding member H in the z-axis direction. A continuous second side margin sheet 117s2 extending along the x-y plane is then disposed on the second side surfaces S2 of the multi-layer units 116 so as to cover all of the second side surfaces S2 in a lump.

The second side margin sheet 117s2 has a higher flexibility than the first side margin sheet 117s1. Therefore, in the second side margin sheet 117s2, a bonding surface P that faces downward in the z-axis direction and is to be bonded to the second side surfaces S2 of the multi-layer units 116 has a higher flexibility than the first side margin 117a.

The flexibilities of the first and second side margin sheets 117s1 and 117s2 can be compared with each other using a Young's modulus. In other words, a Young's modulus measured at the bonding surface P of the second side margin sheet 117s2 is smaller than a Young's modulus measured at the upper surface or lower surface of the first side margin sheet 117s1 in the z-axis direction.

Additionally, the first pressing member E1 is disposed above the second side margin sheet 117s2 in the z-axis direction. Note that the first pressing member E1 used in the second thermocompression bonding of Step S45 does not need to be the same as the first pressing member E1 used in the first thermocompression bonding of Step S42, and a member corresponding to the physical property of the second side margin sheet 117s2, conditions of the second thermocompression bonding, and the like is selectable as appropriate.

Next, as shown in FIG. 13B, the first pressing member E1 is moved downward in the z-axis direction, and a pressing force downward in the z-axis direction is applied to the second side margin sheet 117s2 while applying heat thereto using the first pressing member E1. At that time, the second side margin sheet 117s2, which is softened by heat, is pressed against the second side surfaces S2 of the respective multi-layer units 116.

In the second thermocompression bonding of Step S45, the heat and the pressing force are applied to not only the second side margin sheet 117s2 but also the first side margins 117a. In other words, the heat and the pressing force are applied to the first side margins 117a twice including the first thermocompression bonding in Step S43 at the stage of the first side margin sheet 117s1.

Figure 14A:
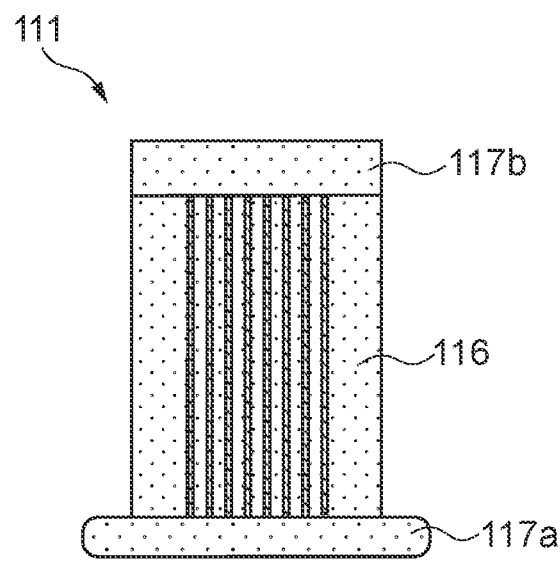
FIGS. 14A and 14B are cross-sectional views of an unsintered ceramic body in which side margin are formed by a general method.
Figure 14B:
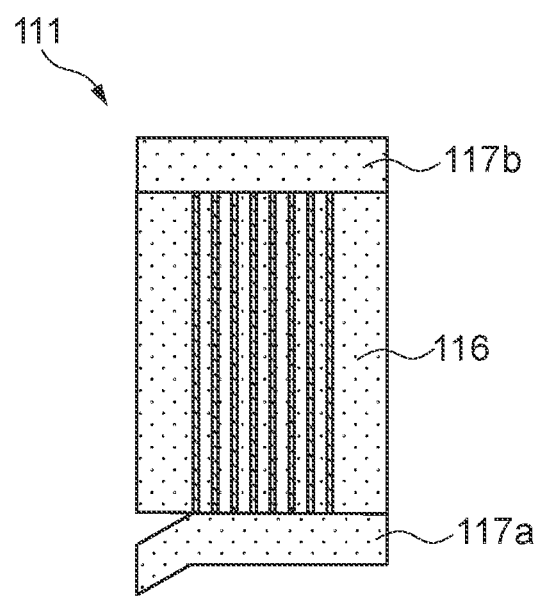

For that reason, a general configuration tends to cause failures shown in FIGS. 14A and 14B. In other words, as shown in FIG. 14A, excessive deformation of the first side margin 117a may cause a large difference in thickness between the first and second side margins 117a and 117b. Additionally, as shown in FIG. 14B, a change in physical property due to the heat may impair the adhesiveness of the first side margin 117a to the first side surface S1 of the multi-layer unit 116, and the first side margin 117a may be peeled off from the first side surface S1 of the multi-layer unit 116.

In contrast to such a general configuration, in this embodiment, the flexibility of the second side margin sheet 117s2 is higher than that of the first side margin sheet 117s1. Aa a result, in the second thermocompression bonding of Step S45, the bonding surface P of the second side margin sheet 117s2 can be brought into close contact with the second side surfaces S2 of the multi-layer units 116 with a lower amount of energy than in the first thermocompression bonding of Step S42.

In other words, in Step S45, the heat and the pressing force applied to the second side margin sheet 117s2 can be reduced. Thus, the heat and the pressing force applied to the first side margins 117a are reduced in Step S45, and thus the amount of deformation of each first side margin 117a in Step S45 can be made small.

Additionally, in Step S45, the heat applied to the second side margin sheet 117s2 is reduced, and thus the change in physical property of the first side margin 117a due to the heat can be suppressed. Thus, in Step S45, the adhesiveness of the first side margin 117a to the first side surface S1 of the multi-layer unit 116 is satisfactorily maintained.

Subsequently, as shown in FIG. 13C, the first pressing member E1 is moved upward in the z-axis direction. Thus, the first pressing member E1 is separated 5 from the second side margin sheet 117s2, and the second side margin sheet 117s2 is held in close contact with the second side surfaces S2 of the respective multi-layer units 116.

3.6 Step S46: Second Punching

Figure 15A:
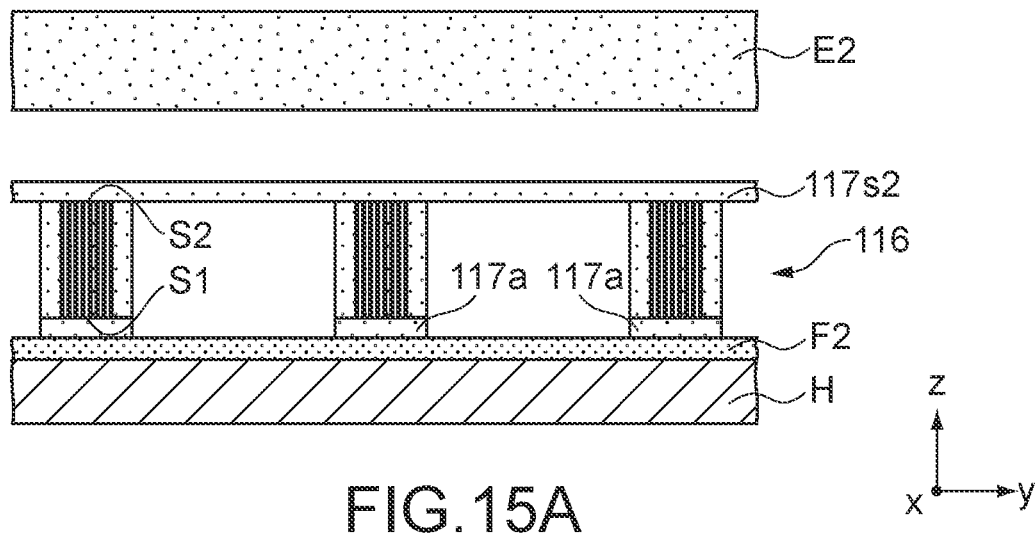
FIGS. 15A, 15B, and 15C are partial cross-sectional views showing a second punching process in the process of forming side margins.
Figure 15B:
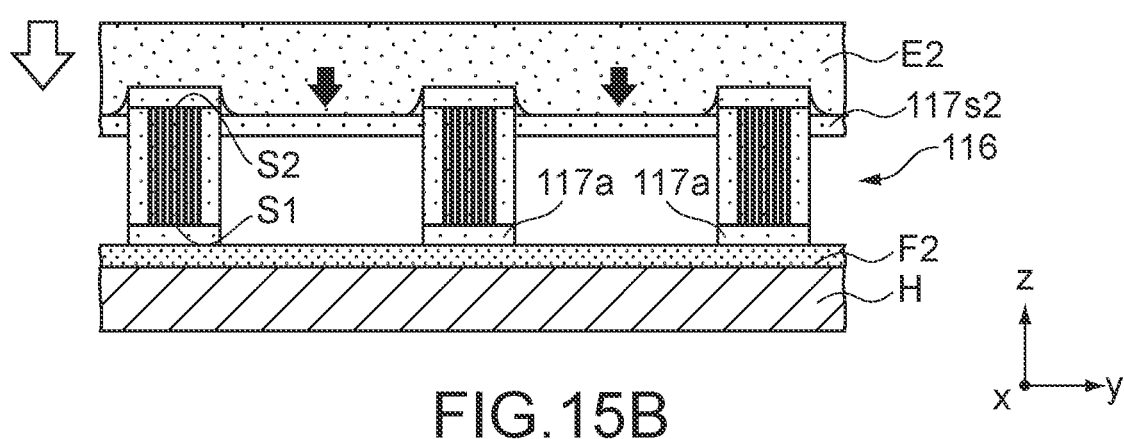
Figure 15C:
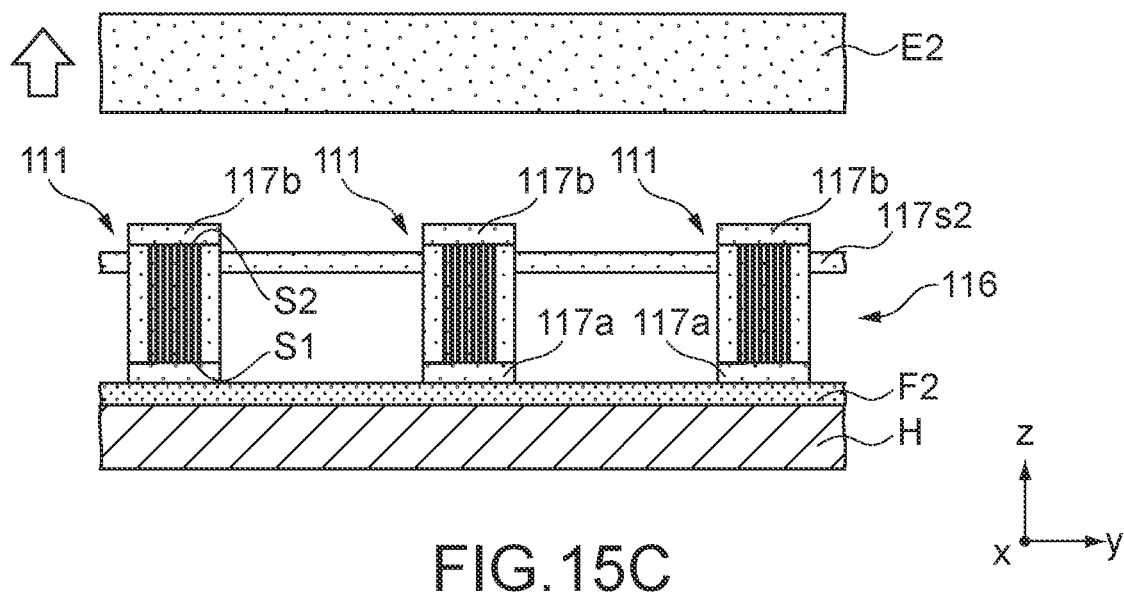

In Step S46, the second side margin sheet 117s2 thermocompression-bonded in Step S45 is punched with the second side surfaces S2 of the respective multi-layer units 116. FIGS. 15A to 15C are views showing a second punching process in Step S46. The second punching in Step S46 can be performed in the manner similar to the first punching in Step S43.

First, as shown in FIG. 15A, the lower surface of the second adhesive sheet F2 in the z-axis direction is held by the holding member H, and the second pressing member E2 is disposed above the second side margin sheet 117s2 in the z-axis direction. Next, as shown in FIG. 15B, the second pressing member E2 is moved downward in the z-axis direction, and the second side margin sheet 117s2 is punched with the second side surfaces S2 of the respective multi-layer units 116.

Note that the second pressing member E2 used in the second punching of Step S46 does not need to be the same as the second pressing member E2 used in the first punching of Step S43, and a member corresponding to the physical property of the second side margin sheet 117s2, conditions of the second punching, and the like is selectable as appropriate.

Subsequently, as shown in FIG. 15C, the second pressing member E2 is moved upward in the z-axis direction and thus separated from the second side margin sheet 117s2. At that time, the second side margin sheet 117s2 left on the second side surface S2 of each multi-layer unit 116 is the second side margin 117b. The second side margin sheet 117s2 left in the spaces between the multi-layer units 116 is removed.

Thus, the first and second side margins 117a and 117b are formed on the first and second side surfaces S1 and S2 of the multi-layer units 116, and the unsintered ceramic body 111 shown in FIG. 9 is obtained. Through the above step, the process of forming the side margins in the method of producing the multi-layer ceramic capacitor 10 according to this embodiment is completed.

3.7 Modified Example

The second side margin sheet 117s2 only needs to have a higher flexibility than the first side margins 117a at the time of the second thermocompression bonding of Step S45, and does not need to have a higher flexibility than the first side margin sheet 117s1. In other words, in this modified example, each of the first and second side margin sheets 117s1 and 117s2 is optionally selectable.

In this modified example, for example, a common ceramic sheet can be used as the first and second side margin sheets 117s1 and 117s2. This allows the first and second side margin sheets 117s1 and 117s2 to be produced at low cost, and thus allows the production cost of the multi-layer ceramic capacitor 10 to be reduced.

In this case, it is necessary to reduce the flexibility of the first side margin 117a before the second thermocompression bonding of Step S45. In order to reduce the flexibility of the first side margin 117a, for example, an organic component (such as a solvent or a binder) in the first side margin 117a can be evaporated by heating.

The timing to reduce the flexibility of the first side margin 117a is optionally selectable if such a timing is before Step S45. For example, such a timing may be after the first punching of Step S43 or may be at the stage of the first side margin sheet 117s1 before the first punching of Step S43.

II Second Embodiment

Figure 16:
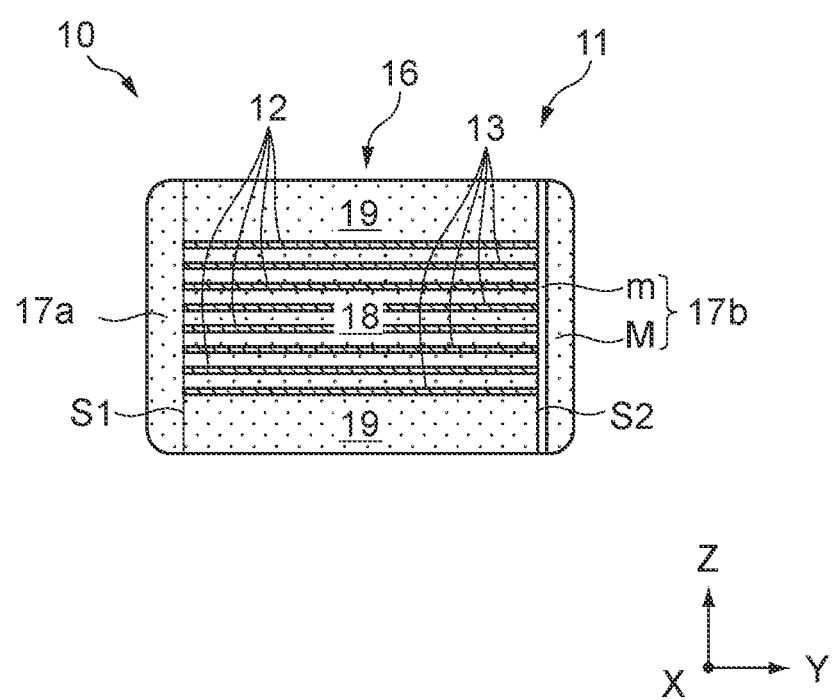
FIG. 16 is a partial cross-sectional view of a multi-layer ceramic capacitor according to a second embodiment of the present disclosure.

Hereinafter, a multi-layer ceramic capacitor 10 according to a second embodiment of the present disclosure will be described. FIG. 16 is a cross-sectional view of the multi-layer ceramic capacitor 10 according to this embodiment. Note that in this embodiment the configurations corresponding to those of the first embodiment will be denoted by similar reference symbols, and description on the configurations similar to those of the first embodiment will be omitted as appropriate.

The multi-layer ceramic capacitor 10 according to this embodiment is different from the first embodiment in that the first side margin 17a and the second side margin 17b have configurations different from each other. Specifically, in the multi-layer ceramic capacitor 10, the first side margin 17a has a single-layer structure, and the second side margin 17b has a multi-layer structure.

The second side margin 17b includes a body layer M and a bonding layer m, which are formed of ceramic sheets different from each other. In the second side margin 17b, the body layer M is configured as a body to perform a main function. The bonding layer m is positioned between the body layer M and the second side surface S2 of the multi-layer unit 16 and bonds the body layer M and the second side surface S2 of the multi-layer unit 16 to each other.

The second side margin 17b includes the bonding layer m so as to obtain sufficient adhesiveness to the second side surface S2 of the multi-layer unit 16 using a low amount of energy. Thus, in the second side margin 17b, the ceramic sheet constituting the body layer M, which is not in direct contact with the second side surface S2 of the multi-layer unit 16, is optionally selectable.

Therefore, in this embodiment, for example, the body layer M of the second side margin 17b can be formed using a common ceramic sheet with the first side margin 17a. This allows the first and second side margins 117a and 117b to be formed at low cost, and thus allows the production cost of the multi-layer ceramic capacitor 10 to be reduced.

The method of producting the multi-layer ceramic capacitor 10 according to this embodiment is different from that of the first embodiment in Step S04 (the process of forming the side margins). In Step S04 according this embodiment, a first side margin sheet 117s1, and a second side margin sheet 117s2 including the body layer M and the bonding layer m are used.

Steps S41 to S44 according to this embodiment are similar to those in the first embodiment. In other words, after the directions of the multi-layer units 116 are changed in Step S41, the first side margins 117a are formed using the first side margin sheet 117s1 in Steps S42 and 43, and the multi-layer units 116 are transferred in Step S44.

Figure 17A:
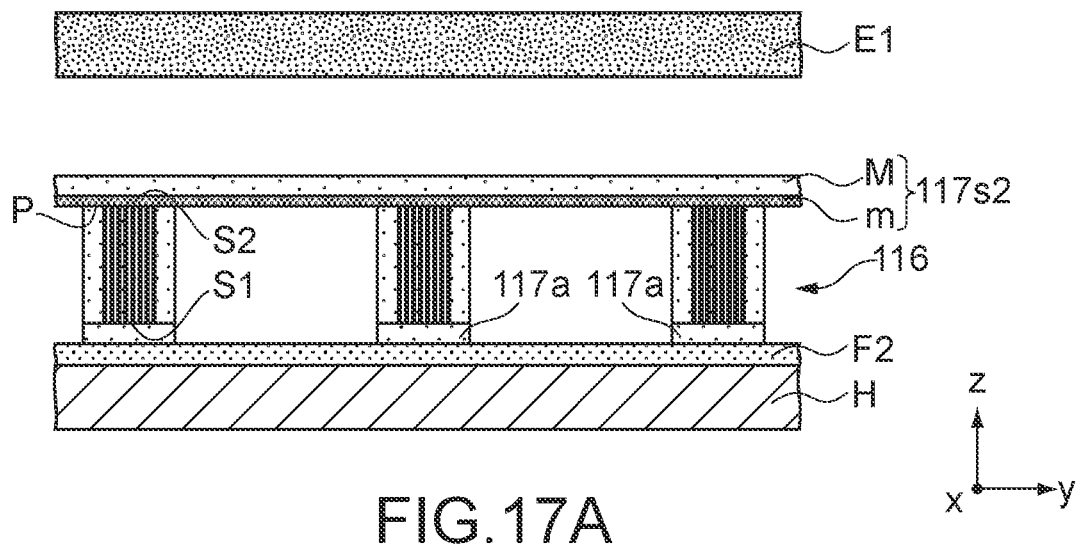
FIGS. 17A, 17B, and 17C are partial cross-sectional views showing a second thermocompression bonding process in the production method for the multi-layer ceramic capacitor.
Figure 17B:
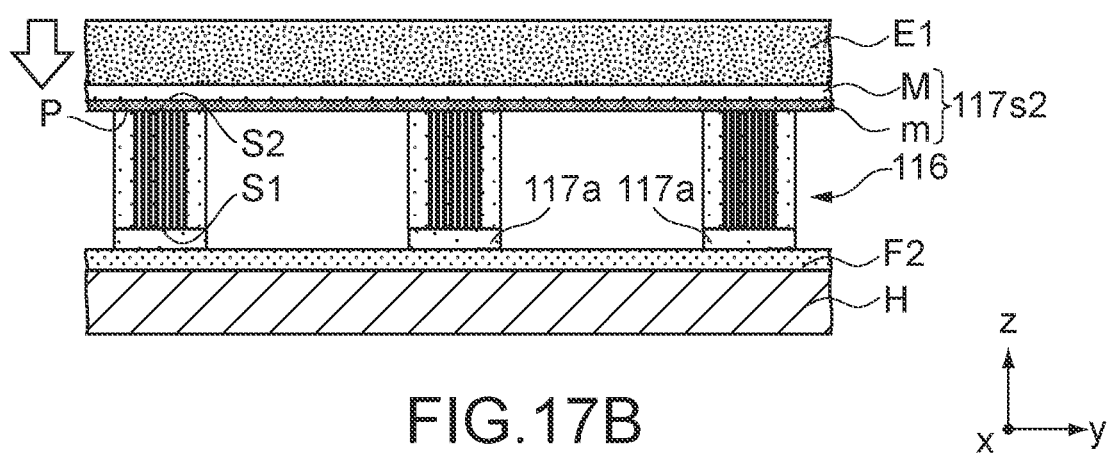
Figure 17C:
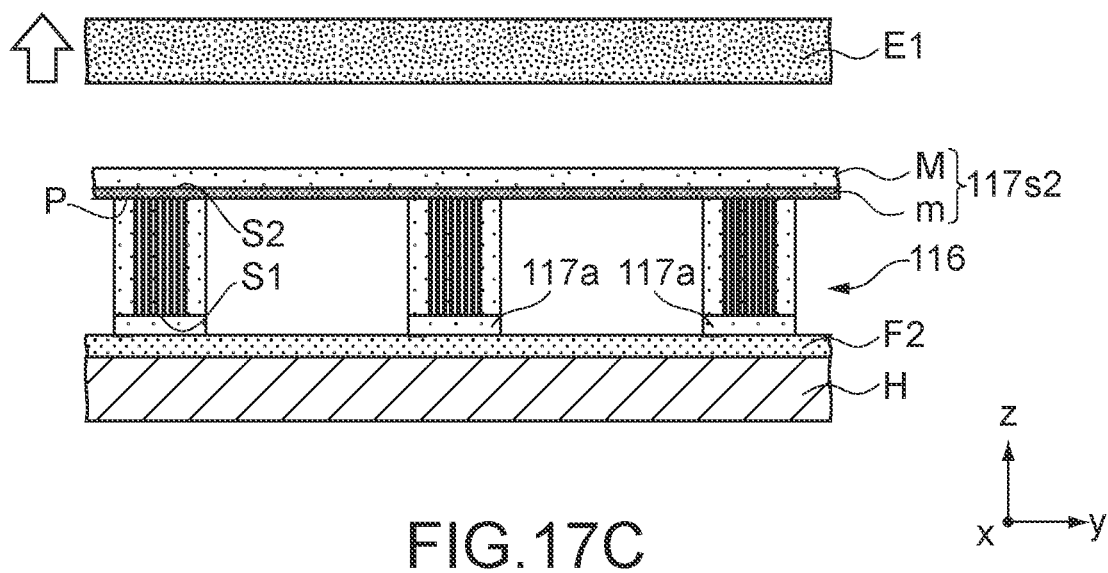

FIGS. 17A to 17C are views showing a second thermocompression bonding process in Step S45 according to this embodiment. In Step S45, first, as shown in FIG. 17A, the second side margin sheet 117s2 is disposed on the second side surfaces S2 of the multi-layer units 116 such that the bonding layer m comes into contact with the second side surfaces S2.

In the second side margin sheet 117s2, the bonding layer m has a higher flexibility than the body layer M and the first side margin sheet 117s1. In other words, in the second side margin sheet 117s2 according to this embodiment, the lower surface of the bonding layer m in the z-axis direction having a higher flexibility is a bonding surface P with respect to the second side surfaces S2 of the multi-layer units 116.

Next, as shown in FIG. 17B, a first pressing member E1 is moved downward in the z-axis direction, and a pressing force downward in the z-axis direction is applied to the second side margin sheet 117s2 while applying heat thereto using the first pressing member E1. As a result, the bonding layer m of the second side margin sheet 117s2, which is softened by heat, comes into close contact with the second side surfaces S2 of the respective multi-layer units 116.

In this embodiment, the second thermocompression bonding of the second side margin sheet 117s2 including the bonding layer m can be performed with a lower amount of energy than the first thermocompression bonding of the first side margin sheet 117s1 including no bonding layer m. Thus, in Step S45 according to this embodiment, the heat and the pressing force applied to the first side margins 117a can be reduced.

Subsequently, as shown in FIG. 17C, the first pressing member E1 is moved upward in the z-axis direction. Thus, the first pressing member E1 is separated from the second side margin sheet 117s2, and the bonding layer m of the second side margin sheet 117s2 is held in close contact with the second side surfaces S2 of the respective multi-layer units 116.

Figure 18A:
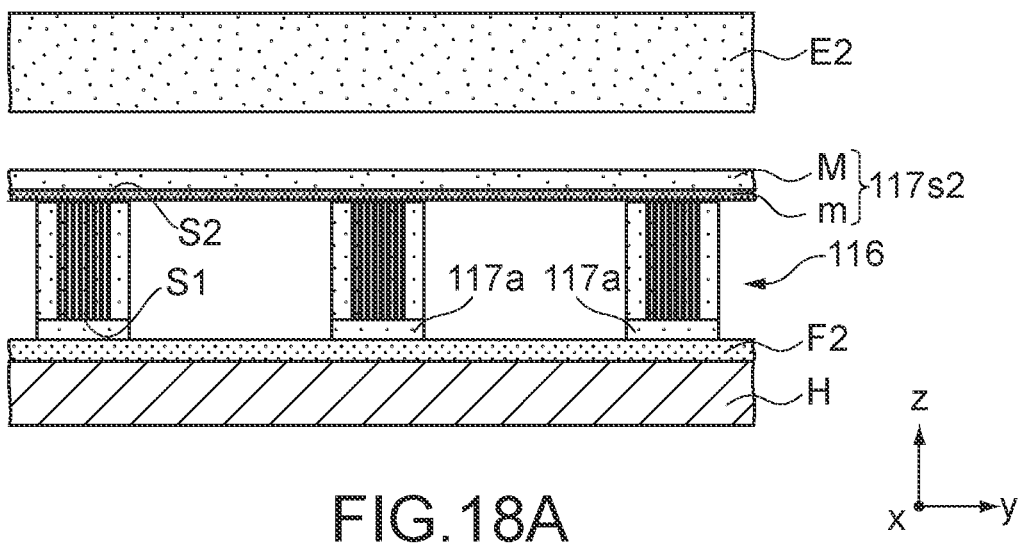
FIGS. 18A, 18B, and 18C are partial cross-sectional views showing a second punching process in the production method for the multi-layer ceramic capacitor.
Figure 18B:
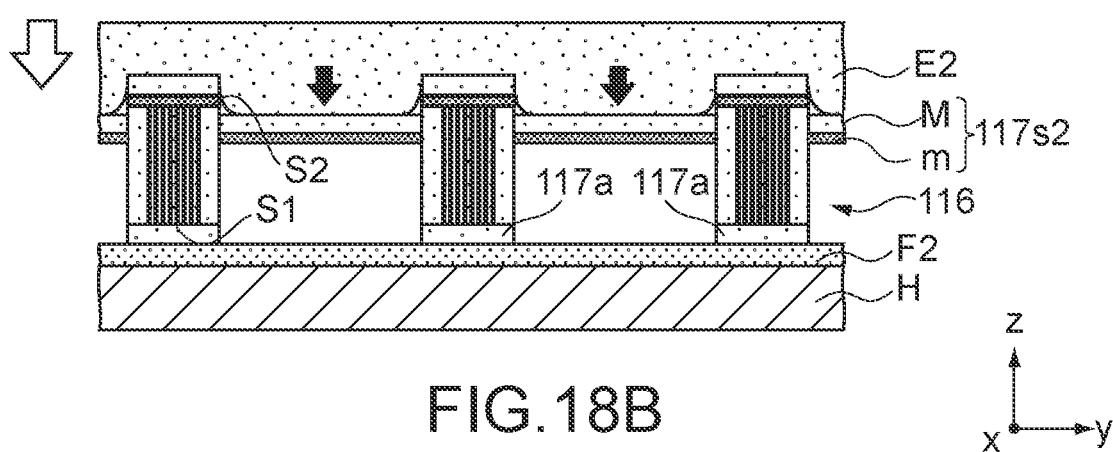
Figure 18C:
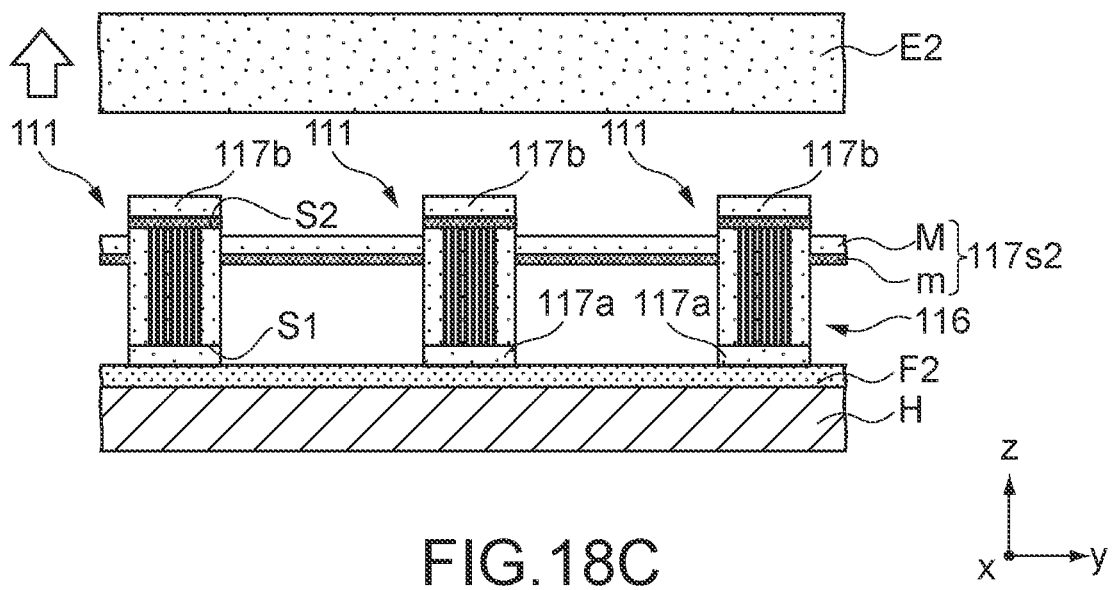

FIGS. 18A to 18C are views showing a second punching process in Step S46 according to this embodiment. In Step S46, first, as shown in FIG. 18A, the lower surface of the second adhesive sheet F2 in the z-axis direction is held by the holding member H, and a second pressing member E2 is disposed above the body layer M of the second side margin sheet 117s2.

Next, as shown in FIG. 18B, the second pressing member E2 is moved downward in the z-axis direction, and the second side margin sheet 117s2 is pressed downward in the z-axis direction. Thus, the body layer M and the bonding layer m are simultaneously punched with the second side surfaces S2 of the respective multi-layer units 116 by a shear force applied to the second side margin sheet 117s2.

Subsequently, as shown in FIG. 18C, the second pressing member E2 is moved upward in the z-axis direction, and thus separated from the second side margin sheet 117s2. At that time, the second side margin sheet 117s2 left on the second side surface S2 of each multi-layer unit 116 is the second side margin 117b.

Figure 19:
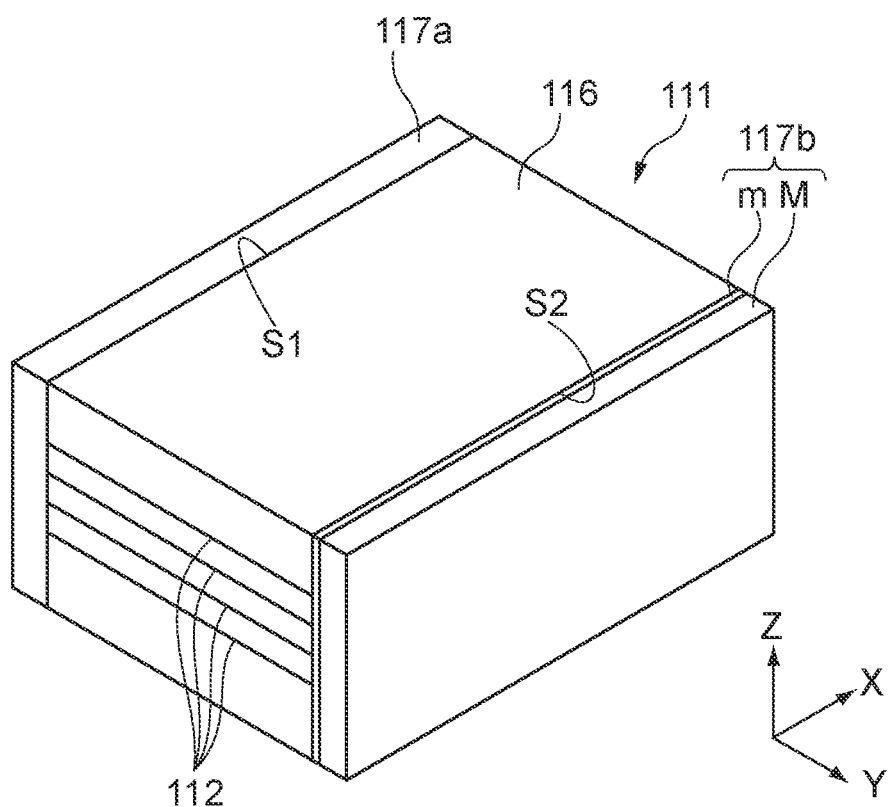
FIG. 19 is a perspective view of an unsintered ceramic body obtained in the second punching process.

Thus, the first and second side margins 117a and 117b are formed on the first and second side surfaces S1 and S2 of the multi-layer units 116, and an unsintered ceramic body 111 shown in FIG. 19 is obtained. Through the above step, the process of forming the side margins in the method of producing the multi-layer ceramic capacitor 10 according to this embodiment is completed. Through Step S05 (sintering) and Step S06 (formation of external electrode) to be performed afterward, the multi-layer ceramic capacitor 10 according to this embodiment is completed.

The multi-layer ceramic capacitor 10 according to this embodiment includes the first side margin 17a that has a single-layer structure and covers the first side surface S1 of the multi-layer unit 16, and the second side margin 17b that has a multi-layer structure and covers the second side surface S2 of the multi-layer unit 16. Further, the second side margin 17b having the multi-layer structure includes the body layer M and the bonding layer m that bonds the second side surface S2 of the multi-layer unit 16 and the body layer M to each other. In such a multi-layer ceramic capacitor 10, the heat and the pressing force applied to the first side margin 117a are reduced, and thus the first side margin 17a is difficult to peel off from the first side surface S1 of the multi-layer unit 116.

III Other Embodiments

While the embodiments of the present disclosure have been described, the present disclosure is not limited to the embodiments described above, and it should be appreciated that the present disclosure may be variously modified.

For example, each of the above embodiments has described the method of producing the multi-layer ceramic capacitor 10 as an example of a multi-layer ceramic electronic component, but the production method of the present disclosure is applicable to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising:
    a multi-layer unit including
    ceramic layers laminated in a direction of a first axis,
    internal electrodes disposed between the ceramic layers, and
    a first side surface and a second side surface facing each other in a direction of a second axis orthogonal to the first axis, end portions of the internal electrodes in the direction of the second axis being positioned on the first side surface and the second side surface;
    a first side margin that has a single-layer structure that contacts the multi-layer unit and has an entirely exposed external surface, and that covers the first side surface, wherein the composition of an entirety of the first side margin is the same throughout; and
    a second side margin that has a multi-layer structure and covers the second side surface, and is laminated in a direction of the second axis.

2. The multi-layer ceramic electronic component according to claim 1, wherein
    the second side margin includes
    a body layer, and
    a bonding layer that bonds the second side surface and the body layer to each other.

3. The multi-layer ceramic electronic component according to claim 2, wherein
    the body layer and the first side margin have the same composition.

* * * * *